(12) United States Patent
Kaji et al.

(10) Patent No.: US 8,264,624 B2
(45) Date of Patent: Sep. 11, 2012

(54) DIGITIZER FUNCTION-EQUIPPED LIQUID CRYSTAL DISPLAY DEVICE INFORMATION PROCESSING ELECTRONIC DEVICE, AND GAME DEVICE

(75) Inventors: Toshiyuki Kaji, Tokyo (JP); Gou Hirose, Tokyo (JP); Takayuki Ohnishi, Tokyo (JP); Hirofumi Maeda, Tokyo (JP)

(73) Assignee: Kabushiki Kaisha Sega, Tokyo (JP)

( * ) Notice: Subject to any disclaimer, the term of this patent is extended or adjusted under 35 U.S.C. 154(b) by 340 days.

(21) Appl. No.: 12/600,800

(22) PCT Filed: May 19, 2008

(86) PCT No.: PCT/JP2008/059130
§ 371 (c)(1),
(2), (4) Date: Dec. 31, 2009

(87) PCT Pub. No.: WO2008/143212
PCT Pub. Date: Nov. 27, 2008

(65) Prior Publication Data
US 2010/0171891 A1 Jul. 8, 2010

(30) Foreign Application Priority Data
May 18, 2007 (JP) .................................. 2007-132484

(51) Int. Cl.
*G02F 1/1335* (2006.01)
(52) U.S. Cl. ........................................................ 349/12
(58) Field of Classification Search ...................... 349/12
See application file for complete search history.

(56) References Cited

U.S. PATENT DOCUMENTS

| 5,771,039 | A | 6/1998 | Ditzik | |
|---|---|---|---|---|
| 6,942,371 | B2 * | 9/2005 | Chen | 362/561 |
| 7,153,016 | B2 * | 12/2006 | Chen | 362/561 |
| 2004/0202009 | A1 | 10/2004 | Chen | |

FOREIGN PATENT DOCUMENTS

| JP | 5-108247 A | 4/1993 |
|---|---|---|
| JP | 7-104910 A | 4/1995 |
| JP | 7-104935 A | 4/1995 |
| JP | 7-210298 A | 8/1995 |
| JP | 8-6721 A | 1/1996 |
| JP | 2002-182197 A | 6/2002 |

* cited by examiner

*Primary Examiner* — Timothy L Rude
(74) *Attorney, Agent, or Firm* — Birch, Stewart, Kolasch & Birch, LLP

(57) ABSTRACT

Provided is a digitizer function-equipped liquid crystal display device capable of preventing the wire shadows of a loop antenna from being projected on a liquid crystal panel and capable of being applied to a large size liquid crystal panel. It is also possible to provide an information processing electronic device and a game device provided with the digitizer function-equipped liquid crystal display device. Here, the digitizer function-equipped liquid crystal display device includes: a liquid crystal panel 1; a light diffusion member 2 which is disposed between the liquid crystal panel 1 and a backlight 5 irradiating the liquid crystal panel 1 with light; an electromagnetic induction type loop antenna which is disposed at a portion apart from the light diffusion member 2 in the direction toward the backlight 5 by a predetermined spacing so as to detect a position on the plane of the liquid crystal panel 1 in one coordinate axis direction and another coordinate axis direction that intersects the one coordinate axis direction; and a spacing retaining means for retaining the spacing between the light diffusion member 2 and loop antenna at a predetermined spacing value. As the spacing retaining means, a first light transmitting member 3 formed of a plate material having a light transmitting property is used.

13 Claims, 12 Drawing Sheets

DIGITIZER FUNCTION-EQUIPPED LIQUID CRYSTAL DISPLAY DEVICE INFORMATION PROCESSING ELECTRONIC DEVICE, AND GAME DEVICE

FIELD OF THE INVENTION

The present invention relates to a digitizer function-equipped liquid crystal display device provided with a digitizer function of an electromagnetic induction type, and an information processing electronic device and a game device provided with the digitizer function-equipped liquid crystal display device.

BACKGROUND OF THE INVENTION

Formerly, digitizer function-equipped liquid crystal display devices, more specifically, various types of liquid crystal display devices which can perform input operation of information by designating the position on a display screen provided therein with an input pen (pen type input device), etc., have been proposed. For these digitizer function-equipped liquid crystal display devices, liquid crystal display devices provided with a digitizer function of an electromagnetic induction type generally have, between a liquid crystal display panel and a backlight device for irradiating the liquid crystal display panel with light, an electrode wire (hereinafter, referred to as loop antenna) serving as a sensor for detecting the coordinate position of a location (point) input by operation of a pen type input device on a display screen of the liquid crystal panel. The electrode wire has a configuration in which conductive super-thin metal wires are arranged in a matrix on a sensor electrode board made of a transparent material so as to detect the coordinates in X-axis direction and Y-axis direction.

The digitizer of an electromagnetic induction type includes a pen type input device provided with a coil and a sensor electrode board in which a loop antenna for detecting the coordinates in X-axis direction and Y-axis direction is arranged. A current is applied to the coil of the pen type input device to generate a magnetic field, and the nib of the pen type input device is brought into contact with the surface of the display screen of the liquid crystal display device (liquid crystal panel). Then, a current is generated in the loop antenna by electromagnetic induction. A control device which controls operation of the digitizer can determine the coordinate position pointed with the pen type input device by analyzing information concerning a value of the generated current, position on the loop antenna at which the current is generated, and the like.

The above-mentioned liquid crystal display device with the sensor electrode board having the loop antenna arranged has the following problems formerly.

(1) Light emitted from the backlight device toward the liquid crystal panel causes wire shadow of the loop antenna by passing the sensor electrode board in which the loop antenna is arranged. This often caused a phenomenon that the wire shadow is projected on the liquid crystal panel. The projection of the wire shadow on the liquid crystal panel made an image displayed on the liquid crystal panel obscure and made it difficult for a user performing input operation of the coordinate position by using the pen type input device on the display screen to designate an accurate position.

(2) In order to solve the trouble of (1), the line width of the loop antenna sensor wire was made thin as much as possible to a level not more than 0.1 mm so as to make the wire shadow hard to occur.

As a technique to prevent the projection of the loop antenna wire shadow on the liquid crystal panel, inventions disclosed in the following Patent Documents 1 to 3 have been proposed.
[Patent Document 1] JP-A-7-104910
[Patent Document 2] JP-A-7-104935
[Patent Document 3] JP-A-2002-182197

Patent Document 1 discloses a backlight type liquid crystal display device comprised by sequentially arranging a liquid crystal panel, a light diffusion plate, and a light guide plate equipped with a light source at its side edge, and configured to prevent the wire shadow of a loop antenna from being projected on a liquid crystal panel by laying the loop antenna having the line width of 50 µm or less on the light guide plate at its liquid crystal panel display device side.

Patent Document 2 discloses a liquid crystal display device comprised by sequentially arranging a liquid crystal panel, a light diffusion plate, a light source, and a reflective plate, and configured to prevent the wire shadow of a loop antenna from being projected on a liquid crystal panel by laying and fixing the loop antenna on the plate surface of the light diffusion plate. Patent Document 2 further discloses that when a loop antenna having the line width of 50 µm or less is laid on the light diffusion plate, the wire shadow of the loop antenna is not projected on the liquid crystal panel.

Patent Document 3 discloses, with the aim of reducing the size and weight of a reflection type liquid crystal display device which does not use a backlight, a reflection type liquid crystal display device configured to prevent the wire shadow of the pattern of a loop antenna from occurring by providing, on the back of a liquid crystal panel, a sensor board in which the loop antenna used for a digitizer is arranged.

DISCLOSURE OF THE INVENTION

Problems to be Solved by the Invention

In the liquid crystal display devices provided with the digitizer sensor section disclosed in Patent Document 1 and Patent Document 2, the line width of the loop antenna is reduced to 50 µm or less so as to prevent the wire shadow of the loop antenna from being projected on the liquid crystal panel. However, in the case where a digitizer function is added to a large size liquid crystal panel, e.g., liquid crystal panel of 40 inches or more, the entire length of the sensor wire of a copper or silver loop antenna is increased to accordingly increase the electric resistance value. Thus, when a loop antenna having the line width of 50 µm or less is used in a large size liquid crystal display device, the increase in the electric resistance value may degrade the accuracy in detecting the coordinate position according to the electromagnetic induction method.

The reflection type liquid crystal display device disclosed in Patent Document 3, in which a sensor board in which the loop antenna is arranged is provided on the back of a liquid crystal panel so as to prevent the wire shadow of the pattern of the loop antenna from occurring, is mainly used as a display device of a small size electronic device such as a mobile phone. Therefore, as described above, this technique does not aim to provide the digitizer function in a large size liquid crystal panel.

On the other hand, a recent improvement in a liquid crystal panel manufacturing technique allows a large size liquid crystal panel to be manufactured with high yield and reduces the manufacturing cost thereof. Under the circumstance, a large size liquid crystal panel has become to be used for various types of information devices as well as for a television receiver. When the digitizer function is added to the large size liquid crystal panel in the information device by using the large size liquid crystal panel so as to perform input operation of various information with high accuracy in an interactive manner between a user and a display screen of the liquid crystal panel, or perform output of various information with high accuracy according to the above input operation, the application field of the large size liquid crystal panel can considerably extended.

For example, the followings can be considered as a high-need application field of information devices in which the liquid crystal display device obtained by adding the digitizer function to the large size liquid crystal panel is utilized.

(1) In a digital television receiver, operation by using a pen type input device is performed, in place of complicated operation by using a conventional remote-controller, to select a program to be recorded, enabling very simple recording reservation operation.

(2) Input operation of various information is controlled so as to be performed in an interactive manner between a player and a display screen of a large size display device of various types of game apparatus installed in video arcades or the progress of a game is controlled according to the above input operation, so as to increase the attractiveness of the game.

(3) An electronic blackboard by using a large size liquid crystal display device, a liquid crystal display screen for video teleconference, liquid crystal display screen for various types of monitoring centers, or the like is connected to a control device such as a personal computer so as to allow required information to be displayed on the liquid crystal display screen promptly upon input operation using a pen type input device. This improves presentation effect and enables an appropriate instruction to be issued based on a monitoring result.

An object of the present invention is therefore to provide a digitizer function-equipped liquid crystal display device which is capable of preventing the wire shadow of the loop antenna from being projected on the liquid crystal panel and capable of being applied especially to a large size liquid crystal panel and various information processing electronic devices and game devices provided with the digitizer function-equipped liquid crystal display device.

Means for Solving the Problems

To achieve the above object, according to the present invention, there is provided a digitizer function-equipped liquid crystal display device, including: a liquid crystal panel; a light diffusion member which is disposed between the liquid crystal panel and a backlight irradiating the liquid crystal panel with light; an electromagnetic induction type loop antenna provided at a position with a distance which directs from the light diffusion member to the backlight, which detects a position of the plane of the liquid crystal panel for one direction of one axis and for another direction of one axis intersecting the one direction of one axis; and a spacing retaining means for retaining the spacing between the light diffusion member and the loop antenna.

In the present invention, the spacing retaining means is a first light transmitting member having two surfaces.

In the present invention, the first light transmitting member is a hard plate material.

In the present invention, at least a part of the loop antenna is comprised by a sensor wire which is formed on a second light transmitting member having two surfaces by screen printing.

In the present invention, the second light transmitting member is a flexible sheet.

In the present invention, the loop antenna is comprised by: the sensor wire which is formed on one surface of the second light transmitting member which is formed on one surface of the second light transmitting member to detect a position for one direction of one axis; and the sensor wire which is formed on the other surface of the second light transmitting member to detect the position for another direction of one axis intersecting the one direction of one axis.

In the present invention, the loop antenna is comprised by: the sensor wire which is formed on one surface of the second light transmitting member to detect a position for one direction of one axis; an insulating layer allowing light to transmit therethrough, which is formed on the sensor wire that detects a position in the one coordinate axis direction; and the sensor wire which is formed on the insulating layer to detect a position for another direction of one axis intersecting the one direction of one axis.

In the present invention, the loop antenna is comprised by: the sensor wire which is formed on one surface of one second light transmitting member to detect a position for one direction of one axis; and the sensor wire which is formed on one surface of another second light transmitting member to detect a position for another direction of one axis intersecting the one direction of one axis.

In the present invention, the loop antenna is comprised by: the sensor wire which is formed, by screen printing, on the surface of the first light transmitting member that is close to the second light transmitting member to detect a position for one direction of one axis; and the sensor wire which is formed on one surface of the second light transmitting member detect a position for another direction of one axis intersecting the one direction of one axis.

In the present invention, the loop antenna is comprised by: the sensor wire which is formed, by screen printing, on one surface of the first light transmitting member to detect a position for one direction of one axis; an insulating layer allowing light to transmit therethrough, which is formed on the sensor wire that detects a position for one direction of one axis; and the sensor wire which is formed, by screen printing, on the insulating layer to detect a position for another direction of one axis intersecting the one direction of one axis.

Further, according to the present invention, there is provided an information processing electronic device provided with the above digitizer function-equipped liquid crystal display device.

Further, according to the present invention, there is provided a game device provided with the above digitizer function-equipped liquid crystal display device.

In the present invention, the digitizer function-equipped liquid crystal display device is installed horizontally in a game table of the game device.

In the present invention, the digitizer function-equipped liquid crystal display device is installed in a game table of the game device so as to be inclined by a predetermined angle with respect to the horizontal direction such that the surface of the digitizer function-equipped liquid crystal display device rises from the front side of the game table toward the far side thereof.

The above information processing electronic device denotes a large size liquid crystal display device provided with a digitizer function according to the present invention such as a television receiver provided with a large size liquid crystal display device, a large size liquid crystal display device which is connected to a personal computer to be used in TV conference, a large size liquid crystal display device used in various monitoring centers as monitoring display device, a large size liquid crystal display device used for displaying an image or used as an information input device, or an electronic blackboard provided with a controller such as a personal computer.

The game device denotes a game device, such as one providing "whack-a-mole game", various fighting game, etc., provided with the digitizer function-equipped liquid crystal display device according to the present invention which is installed horizontally in the game table of the game device or installed so as to be inclined with respect to the horizontal direction to allow a player by using a coordinate input means such as a coordinate input pen to enjoy action of a game around the game table.

Advantages of the Invention

In the digitizer function-equipped liquid crystal display device of the present invention, the electromagnetic induction type loop antenna is disposed at a position apart from the light diffusion member provided on the back surface of the liquid crystal panel by a predetermined spacing, so that it is possible to prevent the wire shadows of the sensor wire of the loop antenna caused by light emitted from the backlight from being projected on the liquid crystal panel. Thus, the wire width of the sensor wire of loop antenna used in a conventional digitizer function-equipped liquid crystal display device can be increased, whereby a large-size digitizer function-equipped liquid crystal display device can be provided.

BEST MODE FOR CARRYING OUT THE INVENTION

First Embodiment

Embodiments of the present invention will be described below with reference to the accompanying drawings. FIG. 1 is an exploded perspective view illustrating a configuration example of the main part of an embodiment of a digitizer function-equipped liquid crystal display device according to the present invention, and FIG. 2 is a cross-sectional view of the digitizer function-equipped liquid crystal display device of FIG. 1.

The digitizer function-equipped liquid crystal display device illustrating the embodiment of the present invention illustrated in FIGS. 1 and 2 includes an liquid crystal panel 1, a light diffusion member 2 disposed on the back surface (rear side) of the liquid crystal panel 1, a light transmitting member (first light transmitting member) 3 disposed on the back surface of the light diffusion member 2, a sensor electrode board 4 having loop antennas X and Y disposed on the back surface of the first light transmitting member 3, and a backlight 5 disposed on the back surface of the sensor electrode board 4. As described above, in the digitizer function-equipped liquid crystal display device according to the present embodiment, the light diffusion member 2, the first light transmitting member 3, and the sensor electrode board 4 are sequentially disposed between the liquid crystal panel 1 and the backlight 5. Reference numeral 6 in FIG. 1 denotes a pen type input device provided with a coil. The pen type input device 6 serves as an input means for a user to point (designate) the display surface of the liquid crystal panel 1 so as to input position information on the display surface to a control device and is activated by a power source such as a dry-cell battery. When the user turns ON a switch provided in the pen type input device 6, a magnetic field is generated only during power-on.

Although not illustrated in FIG. 1, a glass substrate or reinforced plastic substrate is provided on the display surface side of the liquid crystal panel 1 for the purpose of protection.

Further, although not illustrated in FIG. 1 and FIG. 2, the liquid crystal panel 1 has a circuit (control) board for driving the liquid crystal panel 1, and the backlight 5 has an inverter circuit for driving the backlight 5, etc. Further, in the embodiment of the digitizer function-equipped liquid crystal display device illustrated in FIG. 1 and FIG. 2, the peripheral portions of the liquid crystal panel 1, light diffusion member 2, first light transmitting member 3, and the like are fixed by a frame body, which are not illustrated in the drawings.

The liquid crystal panel 1 is a liquid crystal panel that has widely been used as a liquid crystal display device and includes a liquid crystal plate 1a encapsulating a liquid crystal material between two glass plates and polarization plates 1b and 1c disposed on both sides of the liquid crystal plate 1a. A thin-film transistor is placed on one of the two glass substrates (array substrates) comprising the liquid crystal plate 1a. Although not illustrated in FIG. 1 (FIG. 2), a color filter for color emission is provided between the array substrate and the polarization plate 1b.

The light diffusion member 2 diffuses light emitted from the backlight 5 so as to give uniform brightness and broadening of the light to the liquid crystal panel 1. The light diffusion member 2 is formed by a synthetic resin plate member or a synthetic resin sheet (film) member, such as an acrylic plate or polycarbonate plate.

Further, the light diffusion member 2 is disposed so as to cover the display surface of the liquid crystal panel 1, so that it is preferable that the area of the light diffusion member 2 be substantially the same as the area of the display surface of the liquid crystal panel 1. However, if the area of the light diffusion member 2 is slightly larger than that of the display surface of the liquid crystal panel 1, there is no problem.

Also, in the case where the light diffusion member 2 is formed by a sheet member, a plurality of the sheet members may be used and laminated. Further, spherical light diffusion particles each having a particle diameter of 1 μm to 3 μm may be dispersed inside the light diffusion member 2 so as to further enhance the effect of diffusing light emitted from the backlight 5.

The first light transmitting member 3 having two surfaces, which is a hard plate material having a light transmitting property that transmits light emitted from the backlight 5, comprises the first feature of the present invention.

In the digitizer function-equipped liquid crystal display device according to the present invention, the sensor electrode board 4 having the loop antennas X and Y is disposed at a position apart from the light diffusion member 2 in the direction toward the backlight 5 by a predetermined spacing (spacing value A). The first light transmitting member 3 serves as a spacing retaining means for retaining the spacing between the light diffusion member 2 and the loop antennas X and Y at the spacing value A. The first light transmitting member 3 serving as the spacing retaining means comprises the first feature of the present invention, and it is preferable that the spacing value A be set to 2 mm to 3 mm by the first light transmitting member 3 made of a hard plate.

In the embodiment illustrated in FIG. 2, the first light transmitting member 3 is disposed at a position on the back side of the light diffusion member 2 and within the spacing provided between the light diffusion member 2 and the sensor electrode board 4 having the loop antennas X and Y so as to be served as a means for retaining the spacing between the light diffusion member 2 and the loop antennas X and Y to the spacing value A and further served as a means for fixing the sensor electrode board 4 having the loop antennas X and Y.

The sensor electrode 4 has a sensor wire x1 which is a loop antenna X for X-axis and a sensor wire y1 which is a loop antenna Y for Y-axis. The sensor wires x1 and y1 are used for detecting, according to an electromagnetic induction method, the coordinate position on the display screen of the liquid crystal panel 1 in one coordinate axis (X-axis) direction (hereafter, it is called as one coordinate axis direction) and in the other coordinate axis (Y-axis) direction that intersects the one coordinate axis direction. It is preferable that the area within which the sensor wires x1 and y1 are formed be substantially the same as the area of the display screen of the liquid crystal panel 1.

For the sensor wire x1 and the sensor wire y1, in the embodiment illustrated in FIG. 2, the sensor wire x1 is formed on one surface of a transparent or semi-transparent second light transmitting member 4a having two surfaces and having a light transmitting property, and flexibility by screen printing with the wire interval set to 4 mm to 6 mm. Similarly, the sensor wire y1 is formed on one surface of a transparent or semi-transparent second light transmitting member 4b having two surfaces and having a light transmitting property, and flexibility by screen printing with the wire interval set to 4 mm to 6 mm. The second light transmitting members 4a and 4b are made to overlap each other in such a manner that the sensor wire x1 and sensor wire y1 formed on the second light transmitting members 4a and 4b, respectively, comprise a matrix and are fixed to the back surface of the first light transmitting member 3. For example, the second light transmitting members 4a and 4b may be adhesively fixed to the back surface of the first light transmitting member 3 by a transparent adhesive.

As the second light transmitting member 4a on which the sensor wire x1 serving as the loop antenna X and the second light transmitting member 4b on which the sensor wire y1 serving as the loop antenna Y, a flexible synthetic resin sheet having a thickness of 50 µm to 200 µm is used. Then, the sensor wire x1 and sensor wire y1 are formed by screen printing on the surfaces of the flexible synthetic resin sheets 4a and 4b, respectively. By forming the sensor wire x1 and sensor wire y1 on the surfaces of the flexible synthetic resin sheets 4a and 4b, respectively, by using screen printing as described above, a plurality of sensor electrode boards 4 having the sensor wire x1 and sensor wire y1 can be produced with high quality and high efficiency. As a material of the second light transmitting members 4a and 4b, a flexible synthetic resin sheet, such as an acrylic resin sheet or polycarbonate sheet, having a thickness of 50 µm to 200 µm can be used.

The configuration in which the sensor wire x1 and sensor wire y1 serving as the loop antennas are formed on the surface of the synthetic resin sheet having flexibility by screen printing comprises the second feature of the present invention. Also, the one coordinate axis direction (X-axis) and the other coordinate axis direction (Y-axis) that intersects the one coordinate axis direction need not intersect each other at right angles, but the intersecting angle between them may be appropriately set depending on the use object of an electronic device provided with the digitizer function-equipped liquid crystal display device according to the present invention. However, it is preferable to allow the one coordinate axis direction (X-axis) and the other coordinate axis direction (Y-axis) to intersect each other at right angles for simplification of coordinate calculation processing performed by software processing and the like.

The sensor wire x1 and sensor wire y1 formed on the surfaces of the second light transmitting members 4a and 4b are formed by screen printing using a conductive paste containing copper (Cu) or copper alloy, silver (Ag) or silver alloy, aluminum (Al) or aluminum alloy, and the like. In addition, the sensor wire x1 (y1) has a thickness of 50 µm to 100 µm and a line width B (illustrated in FIG. 2, etc.) of 300 µm to 500 µm. That is, as compared with the line width (100 µm) of the sensor wire used in a conventional digitizer, the line width of the sensor wire used in the digitizer according to the present embodiment is made larger by being formed by screen printing. In this manner, the configuration in which the line width B of the sensor wire x1 and sensor wire y1 serving as the loop antennas is made as large as 300 µm to 500 µm comprises the third feature of the present invention.

In the present invention, even when the line width B of the sensor wires x1 and y1 is made as large as 300 µm to 500 µm, the wire shadows of the sensor wires x1 and y1 are not projected on the liquid crystal panel 1. The reason for this lies in the first feature of the present invention in which the light diffusion member 2 and sensor electrode board 4 are disposed apart from each other by a predetermined spacing, i.e., the spacing value A. The details of the reason why the wire shadows are not projected on the liquid crystal panel 1 will be described later. Further, by making the line width B of the sensor wire x1 and sensor wire y1 as large as 300 µm to 500 µm, it is possible to prevent the electric resistance value of a current flowing through the sensor wire x1 and sensor wire y1 to be increased. Thus, the digitizer function-equipped liquid crystal display device according to the present invention allows a digitizer function to be added to a large size liquid crystal panel 1.

Although the sensor electrode board 4 illustrated in FIG. 2 is formed by the following procedure: forming the sensor wire x1 on one surface of the second light transmitting member 4a; forming the sensor wire y1 on one surface of the second light transmitting member 4b; and allowing the second light transmitting members 4a and 4b to overlap each other. However, the order in which the second light transmitting members 4a and 4b are allowed to overlap each other may arbitrarily changed as described above.

Further, the sensor electrode board 4 having the sensor wire x1 and sensor wire y1 serving as the loop antennas may adopt, in addition to the embodiment illustrated in FIG. 2, any of the following configurations (a), (b), (c), and (d).

(Configuration a)

As illustrated in FIG. 3, the sensor electrode board 4 has the second light transmitting member 4a having two surfaces, on the respective surfaces of which the sensor wire x1 and sensor wire y1 are formed by screen printing so as to constitute a matrix. Then, the second light transmitting member 4a serving as the sensor electrode board 4 is disposed and fixed on the back surface of the first light transmitting member 3. The disposition of the sensor wires x1 and y1 to be formed on one surface and the other surface of the second light transmitting member 4a may arbitrarily be determined. When the sensor electrode board 4 having the above configuration is adopted, the second light transmitting member 4b can be omitted as compared to the configuration illustrated in FIG. 2.

(Configuration b)

As illustrated in FIG. 4, the sensor wire x1 is formed on one surface of the second light transmitting member 4a having two surfaces by screen printing, and a transparent insulating layer 4c is formed on the sensor wire x1 by screen printing, etc., in a uniform plane. Subsequently, the sensor wire y1 is formed on the insulating layer 4c by screen printing so as to allow the sensor wires x1 and y1 to constitute a matrix. Then, the second light transmitting member 4a serving as the sensor electrode board 4 is disposed and fixed on the back of one surface of the first light transmitting member 3. The disposition of the sensor wires x1 and y1 to be formed on the surfaces of the second light transmitting member 4a may arbitrarily be determined. When the sensor electrode board 4 having the above configuration is adopted, the second light transmitting member 4b can be omitted as compared to the configuration illustrated in FIG. 2 as in the case of the above configuration a.

(Configuration c)

As illustrated in FIG. 5, both the sensor wire x1 and sensor wire y1 are formed on one surface of the first light transmitting member 3 having two surfaces. That is, the first light transmitting member 3 and the sensor electrode board 4 are integrally formed. The formation procedure of the sensor wire x1 and sensor wire y1 serving as the loop wires is as follows. Firstly, the sensor wire x1 is formed on one surface of the first light transmitting member 3 by screen printing. Then, a transparent insulating layer 4c is formed on the surface on which the sensor wire x1 has been formed by screen printing in a uniform plane, and the sensor wire y1 is formed on the insulating layer 4c by screen printing so as to allow the sensor wires x1 and y1 to constitute a matrix. The disposition of the sensor wires x1 and y1 to be formed on one surface of the first light transmitting member 3 may arbitrarily be determined. When the digitizer function-equipped liquid crystal display device is assembled, the first light transmitting member 3 is disposed such that the surface on which the sensor wires x1 and y1 have been formed faces the backlight 5.

By adopting a configuration in which the first light transmitting member 3 and the sensor electrode board 4 are integrally formed, the second light transmitting members 4a and 4b can be omitted; thereby, it performs to make the distance between the display surface of the liquid crystal panel 1 and the sensor electrode board 4 smaller, that is, to reduce the thickness of the digitizer function-equipped liquid crystal display device.

(Configuration d)

As illustrated in FIG. 6, the sensor wire x1 (or the sensor wire y1) is formed on one surface of the first light transmitting member 3 having two surfaces by screen printing. Then, as close to the one surface of the first light transmitting member 3 on which the sensor wire x1 (or sensor wire y1) has been formed, the second light transmitting member 4a on which the sensor wire y1 (or the sensor wire x1) has been formed by screen printing is disposed, in an overlapping manner so as to allow the sensor wires x1 and y1 constitute a matrix. When the sensor electrode board 4 having the above configuration d is adopted, the second light transmitting member 4b can be omitted as compared to the configuration illustrated in FIG. 2 as in the case of the above configuration a.

The backlight 5 serves a means for supplying the liquid crystal panel 1 with light emitted from light sources 5a provided outside because the liquid crystal itself encapsulated in the liquid crystal panel 1 does not emit light. The backlight 5 includes a reflective layer 5b for reflecting the light emitted from the light sources 5a in the direction toward the liquid crystal panel 1.

As the light sources 5a used in the backlight 5, a cold-cathode tube (fluorescent) lamp, a light-emitting diode (LED), and an electroluminescence (EL), which have commonly been used, can be used. Although the backlight 5 illustrated in FIG. 1 is a direct-type backlight 5 in which a plurality of cold-cathode tube lamps are arranged on the back surface of the sensor electrode board 4, a conventionally used sidelight-type backlight 5 may be used in the present invention.

Operation of the liquid crystal display device according to the present invention will be described. FIG. 7 is a view schematically illustrating a light path along which light emitted from the light sources 5a of the backlight 5 goes toward the liquid crystal panel 1 in the liquid crystal display device according to the present invention.

As illustrated in FIG. 7, light emitted from the light sources 5a of the backlight 5 and light reflected by the reflective layer 5b go toward the liquid crystal panel 1 within light paths 7a and 7b and within light paths 7c and 7d. Subsequently, in the light passing through the sensor electrode board 4, light going in the direction toward the sensor wires x11, x12, x13, x14, ..., which are formed on the sensor electrode board 4 and each have a line width B form shadows (wire shadows) 8a, 8b, 8c, 8d, ..., each having a predetermined length in the direction toward the liquid crystal panel 1 by these sensor wires x11, x12, x13, x14, ..... However, in the present embodiment, the light diffusion member 2 and sensor electrode board 4 which are arranged on the back surface of the liquid crystal panel 1 are disposed apart from each other by a predetermined spacing value A as illustrated in FIG. 7, so that the wire shadows 8a, 8b, 8c, 8d, ..., that have once been generated are eliminated by light coming from other directions.

The phenomenon that the wire shadows 8a, 8b, 8c, 8d, ..., are eliminated as illustrated in FIG. 7 in this manner occurs due to the following mechanism. That is, when the thickness of the first light transmitting member 3 is set larger than a predetermined value A, the wire shadows 8a, 8b, 8c, 8d, ..., are eliminated (areas 9a, 9b, 9c, 9d, ... in FIG. 7) as illustrated in FIG. 7 by the light emitted from adjacently disposed light sources 5a or light reflected by the reflective layer 5b. That is, when the thickness of the first light transmitting member 3 is set such that the spacing between the light diffusion member 2 and the sensor electrode board 4 becomes the predetermined spacing value A, it is possible to prevent the wire shadows 8a, 8b, 8c, 8d, ..., formed by the sensor wires x11, x12, x13, x14, ... from reaching the light diffusion member 2. As a result, it is possible to reliably prevent the liquid crystal panel 1 from being influenced by the wire shadows 8a, 8b, 8c, 8d, ..., formed by the sensor wires x11, x12, x13, x14, .....

Although only the wire shadows of the sensor wire x1 are illustrated in FIG. 7, it is possible to eliminate the wire shadows of the sensor wire y1 by using the same mechanism to thereby prevent the wire shadows from reaching the light diffusion member 2. Also, the phenomenon that the wire shadows are eliminated can occur by the same mechanism even in a configuration in which a sidelight-type backlight 5 is used.

On the other hand, FIG. 15 illustrates a state of the wire shadows formed by the sensor wires x11, x12, x13, x14, ... in a digitizer function-equipped liquid crystal display device in which the first light transmitting member 3 having the thickness A illustrated in FIG. 2, etc., is not provided but the sensor electrode board 4 is directly disposed on the back surface of the light diffusion member 2.

As illustrated in FIG. 15, when the sensor electrode board 4 is disposed on the back surface of the light diffusion member 2 without providing the spacing value A, the wire shadows 8a, 8b, 8c, 8d, ..., reach the light diffusion member 2. The wire shadows that have reached the light diffusion member 2 are diffused by the light diffusion member 2 and reach the liquid crystal panel 1. As a result, when an image is displayed on the display surface of the liquid crystal panel 1 under the control of the control device, the wire shadows formed by the sensor wire x1 and sensor wire y1 are projected as a strip pattern, adversely affecting user's input operation of the coordinate position by using the pen type input device 6.

Furthermore, in order to prevent the wire shadows of the sensor wire from reaching the light diffusion member 2, the spacing value A between the light diffusion member 2 and the sensor electrode board 4 having the loop antennas X and Y may appropriately set in consideration of the line widths of the sensor wire x1 and sensor wire y1, interval between an adjacently disposed pair of the sensor wire x1 and sensor wire y1 arranged in a matrix, and the like. However, if the spacing value A is set too large, the distance between the display surface of the liquid crystal panel 1 and the sensor electrode board 4 is made large, which may degrade the detection accuracy of the coordinate position pointed by the pen type input device 6 and increase the thickness of the digitizer function-equipped liquid crystal display device.

In the experiments made by the present inventor using a 40-inch liquid crystal panel 1, the sensor wire X and the sensor wire Y were formed by screen printing such that the line widths thereof are set to 300 µm to 500 µm, and the spacing value A was set to 2 mm to 3 mm. Even in this case, the wire shadows were not projected on the liquid crystal panel 1, and a satisfactory detection accuracy of the coordinate position pointed by the pen type input device 6 was obtained.

As described above, in the above embodiments of the digitizer function-equipped liquid crystal display device according to the present invention, the light diffusion member 2 and the sensor electrode board 4 are disposed apart from each other by a predetermined spacing value (distance) A, so that the wire shadows of the sensor wire x1 and sensor wire y1 are not projected on the liquid crystal panel 1. This allows the line widths of the sensor wire x1 and sensor wire y1 to be made as large as 300 µm to 500 µm; in addition, this allows the sensor wire x1 and sensor wire y1 serving as the loop antennas X and Y to be effectively formed by the screen printing on the first light transmitting member 3, the second light transmitting members 4a and 4b, and/or the like.

When the line widths of the sensor wires x1 and y1 are increased to 300 µm to 500 µm as compared to a conventional sensor wire in this way, it is possible to prevent the electric resistance value of a current flowing through the sensor wires having the large widths from increasing, as described above. Thus, even when the spacing value A of 2 mm to 3 mm is provided between the light diffusion member 2 and the sensor electrode board 4, the detection accuracy of the coordinate position pointed by the pen type input device 6 is not degraded. Rather, the mechanism that increases the detection accuracy of the coordinate position works, so that it is possible to provide especially a large size digitizer function-equipped liquid crystal display device such as a digitizer function-equipped liquid crystal display device having a screen size of 40 inches (100 cm) or more, and various information processing electronic devices and game devices provided with the large size digitizer function-equipped liquid crystal display device.

Further, the digitizer function-equipped liquid crystal display device according to the present invention has a configuration in which the light diffusion member 2 and the sensor electrode board 4 are disposed apart from each other by a predetermined spacing value (distance) A between conventionally used liquid crystal panel and backlight. Thus, it is not necessary to change at all the conventional manufacturing process of the liquid crystal panel 1.

Furthermore, in the above embodiments according to the present invention, an example is described that the light diffusion member 2 and the loop antennas X and Y (sensor electrode board 4) are disposed apart from each other by a predetermined spacing value A, and the first light transmitting member 3 made of a plate material having a light transmitting property is provided in the predetermined spacing as a spacing retaining means for retaining the spacing between the light diffusion member 2 and the loop antennas X and Y. Alternatively, however, the portion defining the spacing value A provided between the light diffusion member 2 and the loop antennas may be an empty space. Embodiments relating to this are illustrated in FIG. 8 and FIG. 9.

In the embodiment illustrated in FIG. 8, spacers S each having a thickness A are provided in the peripheral portions between the light diffusion member 2 and the sensor electrode board 4 including the second light transmitting member 4a forming the loop antennas. Then, the spacers S serve as a spacing retaining means for retaining the spacing between the light diffusion member 2 and the loop antennas X and Y. As a result, an empty space portion K having the spacing value A is formed in the spacing between the light diffusion member 2 and the loop antennas X and Y.

The empty space portion K having the spacing value A formed by the spacers S in the manner as described above has a light transmitting property, so that the empty space portion K produces the same effect as that obtained by the first light transmitting member 3 illustrated in FIG. 2 to FIG. 6. That is, it is possible to prevent the wire shadows of the sensor wires x1 and y1 caused by the light emitted from the backlight 5 from reaching the light diffusion member 2.

In the embodiment illustrated in FIG. 8, an example, the spacers S are used as the empty space portion K, which is the spacing between the light diffusion member 2 and the loop antennas X and Y; and the spacers S is used as a spacing retaining means for retaining the width of the empty space portion K as the spacing value A. Alternatively, however, the following means may be adopted as the spacing retaining means. That is, the light diffusion member 2 and sensor electrode board 4 having the loop antennas X and Y are fixed to the frame body supporting the liquid crystal display device 1, and the frame body of the liquid crystal display device 1 is used as the spacing retaining means to retain the empty space portion K having the spacing value A.

Further, in the embodiment illustrated in FIG. 8, it is preferable that the peripheral portions of the second light transmitting member 4a having the sensor wires x1 and y1 be supported by not-illustrated supporting means for imparting a moderate tension to the second light transmitting member 4a formed of a sheet material so as to allow the second light transmitting member 4a to be supported/fixed in a planar state.

The embodiment of FIG. 9 illustrates an example in which a first light transmitting member 3a forming the loop antennas is disposed in place of the second light transmitting member 4a forming the loop antenna illustrated in FIG. 8. That is, in the embodiment illustrated in FIG. 9, the first light transmitting member 3a formed of a hard plate material on one surface of which the sensor wires x1 and y1 serving as the loop antennas X and Y are formed is disposed at a position spaced apart from the light diffusion member 2 by a distance corresponding to the width of the empty space portion K having the spacing value A. The first light transmitting member 3a may have the same material and thickness as the material and thickness of the first light transmitting member 3 illustrated in FIG. 2 to FIG. 6. Preferably, however, the thickness of the first light transmitting member 3a is smaller than the thickness A of the first light transmitting member 3.

The sensor wire x1 and sensor wire y1 serving as the loop antennas on one surface of the first light transmitting member 3a in the configuration of FIG. 9 can be formed by the same formation method as that used for forming the loop antennas on the first light transmitting member 3 in the configuration (configuration c) of FIG. 5. That is, the sensor wire x1 is formed on one surface of the first light transmitting member 3a by screen printing. Then, a transparent insulating layer 4c is formed on the surface on which the sensor wire x1 has been formed by screen printing or the like in a uniform plane, and the sensor wire y1 is formed on the insulating layer 4c by screen printing so as to allow the sensor wires x1 and y1 to constitute a matrix. Further, the disposition of the sensor wires x1 and y1 to be formed on one surface of the first light transmitting member 3a may arbitrarily be determined. When the digitizer function-equipped liquid crystal display device is assembled, the first light transmitting member 3a is disposed such that the surface of the first light transmitting member 3a on which the sensor wires x1 and y1 have been formed faces the empty space portion K.

Furthermore, it is preferable that air be encapsulated in the empty space portion K provided in the embodiments of FIGS. 8 and 9. Alternatively, however, inactive gas such as nitrogen or helium gas or transparent liquid may be encapsulated in the empty space portion K or the empty space portion K may be vacuumized.

An example in which the digitizer function-equipped liquid crystal display device according to the present invention is applied to an information processing electronic device will be described. FIG. 10 illustrates an example of an electronic blackboard system in which the digitizer function-equipped liquid crystal display device according to the present invention is applied to an electronic blackboard 10 used for making various presentations.

The electronic blackboard system illustrated in FIG. 10 includes an electronic blackboard 10 provided with a digitizer function-equipped liquid crystal display device 11 according to the present invention, a pen type input device 13 for inputting the coordinate position to a display screen sections 12a and 12b of the digitizer function-equipped liquid crystal display device 11, an electronic blackboard controller 14 that executes processing of analyzing coordinate information designated by the pen type input device 13, and a personal computer 15 that controls operation of the electronic blackboard system. The electronic blackboard system 10 and the electronic blackboard controller 14, and the electronic blackboard controller 14 and the personal computer 15 are connected to each other by cables in a data communicable manner. The personal computer 15 is provided with a Web browser and can connect to Internet 16.

In FIG. 10, the display screen section 12a of the digitizer function-equipped liquid crystal display device 11 is provided as an area that a presenter can freely use. Also, the display screen section 12b is provided as an area on which various menus representing the functions of the electronic blackboard system are displayed by program control of the personal computer 15.

In the electronic blackboard system having the above configuration, an operation control program provided in the personal computer 15 displays, as a default screen, the display screen section 12a of the electronic blackboard 10, for example, in a white color. When the presenter operates the pen type input device 13 to designate the display area of "red" displayed in the display screen section 12b as one of the menus, current is generated in the sensor wire x1 and sensor wire y1 of the sensor electrode board 4 disposed on the back surface of the display screen section 12b. This current value is input to the electronic blackboard controller 14, and the electronic blackboard controller 14 performs processing of analyzing the current value to thereby obtain the coordinate value designated by the pen type input device 13. Then, the electronic blackboard controller 14 transmits the obtained coordinate value to the personal computer 15 together with a control command. Upon receiving the control command and the coordinate value, the personal computer 15 refers to a database in which a relationship between the coordinate values and colors to be drawn has been registered. Then, when the presenter uses the pen type input device 13 to trace the display area 12a, the personal computer 15 displays the traced trajectory in "red" color based on the relationship stored in the database.

When the presenter moves the pen type input device 13 while tracing the display area 12a with the nib, information concerning the current value detected by the sensor electrode board 4 is input to the electronic blackboard controller 14 in real time, and the analyzed coordinate information is transmitted to the personal computer 15. Upon receiving the coordinate information, the personal computer 15 execute the process to transmit a control command instructing that the designated coordinate value be displayed in "red" color to the electronic blackboard controller 14. With the above configuration, the electronic blackboard controller 14 can perform control such that the trajectory formed by tracing the display area 12a with the pen type input device 13 is displayed in red color promptly. Thus, when the presenter uses the pen type input device 13 to depict an image or write characters, the information corresponding to the image or characters can promptly be displayed on the display area 12a.

Further, a configuration is possible in which when the presenter operates the pen type input device 13 to designate "PC screen" in the menu area 12b, screen information currently being displayed on the screen of the personal computer 15 is displayed on the display area 12a. For example, when the personal computer 15 is connected to the Internet so as to perform information search, screen information representing the search result is displayed on the display screen section 12a of a large size digitizer function-equipped liquid crystal display device 11 to increase the presentation effect.

An embodiment in which the digitizer function-equipped liquid crystal display device according to the present invention is applied to a game device will be described with reference to FIG. 11 to FIG. 14.

FIG. 11 is a side view illustrating a basic configuration of a game device G to which the digitizer function-equipped liquid crystal display device according to the present invention is applied. FIG. 11 (a) illustrates an example in which a digitizer function-equipped liquid crystal display device 22 according to the present invention is installed horizontally in a game table 21 of a game machine 20, and FIG. 11 (b) illustrates an example in which the digitizer function-equipped liquid crystal display device 22 is installed so as to be inclined with respect to the horizontal direction by an angle α such that the surface of the digitizer function-equipped liquid crystal display device 22 rises from a front side 21a of the game table 21 toward a far side 21b thereof. In FIG. 11, reference numeral 23 denotes an input pen (or figure) for a player to trace the display surface of the digitizer function-equipped liquid crystal display device 22 during execution of a game or to designate an image, etc., displayed on the display surface, and reference numeral 24 denotes a controller that controls the game progression or output of various game images or sounds. The inclination angle α of the game table 21 illustrated in FIG. 11 (b) is preferably set in a range of from about 10° to 50° in accordance with the configuration of the game device.

Further, the input pen or FIG. 23 has the same function as that of the pen type input device 6 or 13 and serves as one of game media that a player uses at the time of execution of a game. That is, the input pen or FIG. 23 provides, inside thereof or in the vicinity of a contacting portion to be brought into contact with the display surface of the digitizer function-equipped liquid crystal display device 22, a coil for generating a magnetic field. Only when the player turns ON a switch provided in the input pen or FIG. 23, a magnetic field is generated.

The game device G illustrated in FIG. 11 is configured for some players to enjoy the game around the table 21; in addition, it adopts an electromagnetic induction method for the position detection of the display surface of the digitizer function-equipped liquid crystal display device 22 which is made using the input pen or FIG. 23; and, thus, even if the hands or arms of the players contact the display surface, the progression of the game is not affected at all.

Then, examples of games suitable for the game device G provided with the digitizer function-equipped liquid crystal display device illustrated in FIG. 11 will be described with reference to FIG. 12 to FIG. 14. Note that the controller 24 illustrated in FIG. 11 is not illustrated in FIG. 12 to FIG. 14.

FIG. 12 illustrates an example in which the game device G is applied to a "whack-a-mole game". In the "whack-a-mole game", a game control program of the controller 24 controls the digitizer function-equipped liquid crystal display device 22 to display game character images 30a, 30a, . . . to be whacked in a random order and random time interval. Further, as illustrated in FIG. 12 (c), coils 33a and 33b are provided in a hammer 31 used in the "whack-a-mole game" so as to extend from the center portions of whacking portions 32a and 32b toward the inside of the hammer 31.

When a player uses the hammer 31 to whack a position corresponding to any of the game character images 30a, 30a, . . . displayed on the digitizer function-equipped liquid crystal display device 22 in a timely manner as illustrated in FIG. 12 (a) and FIG. 12 (b), the game control program performs processing of deleting the game character image that has been whacked from the digitizer function-equipped liquid crystal display device 22. The process to eliminate the game character image is, the game control program calculates the coordinate value at which the coil 33a or 33b is brought into contact with the display screen of the digitizer function-equipped liquid crystal display device 22 when the player uses the hammer 31 to whack any of the game character images 30a, 30a, . . . and, when determining that the coordinate value falls within a predetermined coordinate range that has previously been set in the whacked game character image, performs the processing of deleting the game character image from the digitizer function-equipped liquid crystal display device 22.

FIG. 13 illustrates an example in which the game device G is applied to a "painting" game. In the "painting game", a theme picture 40 is displayed in a right-half area 23a of the display screen of the digitizer function-equipped liquid crystal display device 22 by the game control program as illustrated in FIG. 13 (a), and a player paints the theme picture 40 in a left-half area 23b of the display screen by using a position indicator (position indicating pen) 41. Further, a coil 43 is embedded inside the position indicating pen 41 at a portion in the vicinity of the nib, as illustrated in FIG. 13 (c).

When the player uses the position indicating pen 41 to paint a picture 42 imitating the theme picture 40 by tracing the display screen 23b as illustrated in FIG. 13 (b), the game control program performs processing of detecting the coordinate value at which the nib of the position indicating pen 41 contacts the display screen 23b. Then, the game control program promptly stores the detected coordinate value in a storage device and displays pixels of a liquid crystal panel corresponding to the coordinate value in a predetermined color such as red. In this manner, the game control program can display pixels of the liquid crystal panel corresponding to the trajectory of the nib of the position indicating pen 41 on the display screen 23b in red, i.e., a picture painted by the player every time it detects the coordinate value at which the nib of the position indicating pen 41 contacts the display screen 23b at a predetermined time interval (for example, $\frac{1}{50}$ sec interval).

Then, when the player operates an end switch provided in the table so as to end the painting, the game control program compares, for example, by pattern matching, theme pattern information of the theme picture 40 that has previously been stored in the storage device and information concerning the coordinate values obtained by the player moving the position indicating pen 41 and stored in the storage device, evaluates, by using a score, the similarity between the two pieces of information according to a predetermined evaluation system; and it displays the score on the display screen 23b. In this manner, a player (or players) can enjoy the "painting" game.

FIG. 14 illustrates an example in which FIGS. 50a and 50b serving as game media are moved on the digitizer function-equipped liquid crystal display device 22 of the game device G to play a fighting game. As illustrated in FIG. 14, the game control program previously displays arms 51a and 51b, etc., of an enemy at predetermined positions on the display screen of the digitizer function-equipped liquid crystal display device 22. Also, a coil 52 is embedded inside the figure (robot) 50a to be moved by a player on the display screen of the digitizer function-equipped liquid crystal display device 22.

When the player moves the robots 50a and 50b on the digitizer function-equipped liquid crystal display device 22, the game control program promptly detects the coordinate value of the robot 50a (50b) and, when determining the distance between the robot 50a (50b) and arms 51a and 51b of the enemy falls within a predetermined value, starts the fighting. Further, values representing the fighting strengths of the robot 50a (50b) and the arms 51a and 51b of the enemy are previously registered in the game control program. With the above configuration, the game control program displays the direct display of fighting, etc., between the robot 50a (50b) and arm 51a (51b) of the enemy for a predetermined time and, after that, displays the direct display of a result for victory or defeat about the fighting. Note that, in the fighting game in which a plurality of figures are used, a configuration may be possible in which an IC chip storing identification information (for example, figure number) that has previously been set for each figure is embedded in each figure. In this case, the identification information of the figure can be detected using the loop antennas of the digitizer function-equipped liquid crystal display device 22, allowing a difference to be made in the level of fighting capability between the figures, which further increases the attractiveness of the game.

When the digitizer function-equipped liquid crystal display device 22 provided with a large size liquid crystal panel of 50 inches or more is used in the game device G, a plurality of players can enjoy the game simultaneously, further increasing the attractiveness of the game.

Further, as illustrated in FIG. 11 (b), when the digitizer function-equipped liquid crystal display device 22 is installed in the game device G so as to be inclined with respect to the horizontal direction by an angle α such that the surface of the digitizer function-equipped liquid crystal display device 22 rises from a front side 21a of the game table 21 toward a far side 21b thereof, a player can view the game image displayed on the digitizer function-equipped liquid crystal display device 22 more easily, facilitating the user's operation of the hammer 31, the position indicating pen 41, and the figure (robot) 50a on the digitizer function-equipped liquid crystal display device 22.

Second Embodiment (Configurations of Loop Antennas X and Y According to the Present Embodiment)

Firstly, with reference to FIG. 16, the sensor electrode board 4 according to the first embodiment of the present invention will be described with reference to FIG. 16. As described above, the loop antennas X and Y of the sensor electrode board 4 are preferably formed on a light transmitting sheet by printing using a conductive plastic or conductive paste containing copper or silver particles. The sensor wires x1 and y1 of the loop antennas X and Y each have a line width of 0.5 mm. Hereinafter, only a configuration of the second light transmitting member 4a on which the loop antenna X for X-axis has been printed will be described. Note that the second light transmitting member 4b has the same configuration as the second light transmitting member 4a except only that the directions in which the loop antenna X for X-axis and the loop antenna Y for Y-axis are laid differ from each other. That is, the second light transmitting member 4b forms the loop antenna Y and includes a not-illustrated common line yc, which is described later and is not illustrated in a figure.

A liquid crystal display area 410 illustrated in FIG. 16 represents an area (display area) within the liquid crystal plate 1a of the liquid crystal panel 1, in which liquid crystal pixels are formed so as to allow an image to be displayed. The size of the sheet of the second light transmitting member 4a of the sensor electrode board 4 is substantially the same as that of the liquid crystal display area 410.

The loop antenna X actually printed on the second light transmitting member 4a preferably has a configuration in which the sensor wire x1 (x11, x12, x13, x14, . . . ) which is one electrode comprising a loop is connected to a common line xc which is the other electrode having a common ground (base) at 5 mm interval.

The common line xc helps make a voltage in the electrode of the sensor wire x1 (x11, x12, x13, x14, . . . ) of the loop antenna X stable. Thus, it is possible to realize highly accurate recognition of X-axis coordinate position.

A recognizable range 420 is an area in the sensor electrode board 4, within which the X-axis coordinate position can be recognized by electromagnetic induction. In the recognizable range 420, the loop antenna X comprised by the sensor wire x1 extends from the common line xc. When the pen type input device as described above is brought close to the recognizable range 420, a current is generated in the loop antenna X by electromagnetic induction. Then, information concerning the generated current value and position at which the current on the loop antenna has been generated is analyzed by a not-illustrated circuit board (controller), whereby the X-axis coordinate position can be recognized.

On the other hand, a recognition-disabled range 430 is an area within which a loop of the sensor wire x1 extending from the common line xc is not formed. Thus, the information concerning the position at which the current on the loop antenna X has been generated cannot be analyzed in this area and, accordingly, the X-axis coordinate position cannot be recognized.

That is, there has been a problem that the coordinate position cannot be recognized in some part (X-axis range within a loop of the sensor wire x1 extending from the common line xc of the second light transmitting member 4a being not formed and Y-axis range within a loop of the sensor wire y1 extending from the common line yc of the second light transmitting member 4b being not formed) of the liquid crystal display area 410.

On the other hand, the sensor wire x1 extending throughout the entire sheet has a line width of 300 μm to 500 μm (0.3 mm to 0.5 mm width) as described above. Thus, by adopting a configuration separating by the spacing value A using the first light transmitting member 3 or 3a, the wire shadows of the sensor wire x1 are not projected on the liquid crystal display area 410 as a stripe pattern within the recognizable range 420.

However, there exists, at the end of the sheet, a connector 460 for connecting to a not-illustrated circuit board (controller) configured to detect a current generated by electromagnetic induction in the respective loop (loop antenna X in the X-axis direction and loop antenna Y in the Y-axis direction). In addition, there exists a dense portion 440 in which the sensor wire x1 is concentrated toward the connector 460 to increase the wire density.

On each of the second light transmitting members 4a and 4b, the dense portion 440 is positioned inside the liquid crystal display area 410 and, in addition, the sensor wire does not allow light to transmit therethrough, so that the light transmission amount is reduced at the portion at which the sensor wire density is high.

Thus, this posed a problem that the shadow of the dense portion of the sensor electrode board 4 was displayed in a triangular-like shape on the end portion of the display surface of the liquid crystal display area 410.

Also, the common lines xc and yc are printed thicker than the widths of the sensor wires x1 and y1 serving as the electrodes of the normal loop antennas, which reduces electric resistance to make the electrodes stable. However, when the common lines xc and yc are printed thicker, the wire shadows of the common lines xc and yc appear on the liquid crystal display area 410.

In order to solve the above mentioned problems, it is only necessary to simply cover the portions of the liquid crystal display area 410 on which the wire shadows appear or increase the size of the frame portion of the liquid crystal panel.

However, the digitizer function-equipped liquid crystal display device according to the embodiments of the present invention is assumed to be incorporated into the electronic blackboard system or game device, etc. That is, a reduction of the size of the frame portion (narrowing of the frame portion) is required in order to achieve a reduction in installation space, reduction in cost, and increase in the display surface. Thus, to make the frame portion wider is not realistic.

As the result of the present inventor's earnest studies and experiments on the subject matter, a configuration of sensor electrode board 45 capable of solving the problems: (1) wire shadows of dense portion appear; and (2) wire shadows of common line xc and common line yc appear has come to be developed.

As in the case of the sensor electric board 4, the sensor electrode board 45 can adopt the configuration (a) illustrated in FIG. 3, configuration (b) illustrated in FIG. 4, configuration (c) illustrated in FIG. 5, and configuration (d) illustrated in FIG. 6, in addition to the embodiment illustrated in FIG. 2.

The sensor electrode board 45 includes second light transmitting members 4c and 4d corresponding to the second light transmitting members 4a and 4b. As described later, by modifying the printing patterns of the loop antennas X and Y or common lines xc and yc on the second light transmitting members 4c and 4d, it is possible to prevent the shadows of the sensor electric board from appearing on the liquid crystal display area.

Other configurations of the liquid crystal display device according to the second embodiment of the present invention are the same as those of the liquid crystal display device according to the above embodiment.

Hereinafter, a detailed description will be made with reference to a drawing.

(Configuration of Second Light Transmitting Member 4c)

With reference to FIG. 17, a configuration of the second light transmitting member 4c on which the loop antenna X has been printed, in the sensor electrode 1board 45 according to the second embodiment of the present invention will be described. Note that a not-illustrated second light transmitting member 4d is a member that detects the Y-axis direction coordinate position and has the same configuration as the second light transmitting member 4c except only that the directions in which the loop antenna X for X-axis and the loop antenna Y for Y-axis are laid differ from each other. That is, the second light transmitting member 4d forms the loop antenna Y and includes a common line yc.

Like the liquid crystal display area 410, a liquid crystal display area 411 corresponds to the portion of the liquid crystal plate 1a in which pixels are formed. A recognizable area 421 of the second light transmitting member 4c is equivalent to the recognizable range 420 of the first embodiment, a recognition-disabled area 431 is equivalent to the recognition-disabled range 430 of the first embodiment, a connector extraction portion 451 is equivalent to a connector extraction portion 450 of the first embodiment, and a connector 461 is equivalent to the connector 460 of the first embodiment.

The size of the second light transmitting member 4c is made larger at a dense portion 441 as compared to the size of the second light transmitting member 4a of the first embodiment.

Thus, the dense portion 441 at which the electrodes are concentrated toward the connector 461 can be provided outside the liquid crystal display area 411. The dense portion 441 can be connected on the substrate along the package of the display device in a bent manner.

With the above configuration, the problem (1) that the shadows of the dense portion appear can be solved, thereby preventing the wire shadows of the sensor electrode board 45 including the loop antennas X and Y from being projected on the display surface of the liquid crystal display device.

Further, even if it is necessary to make the line widths of the sensor wires x1 and y1 or common lines xc and yc in the dense portion 441 larger than 0.3 mm to 0.5 mm for design reasons, it is possible to eliminate the influence of the increase in the line width by providing the dense portion 441 outside the liquid crystal display area 411.

Further, unlike the sensor electrode board 4 of the first embodiment, in the second light transmitting member 4c, a configuration in which a plurality of common lines are provided may be adopted in place of a configuration in which the line width of the common line is made corresponding to 0.3 mm to 0.5 mm of the line widths of the electrodes. FIG. 17 illustrates an example in which two common lines xc1 and xc2 are provided. As described above, without making the line width larger, it is possible to make the electrodes stable, as in the case where the line width of the common line is made larger, by providing a plurality of common lines.

Further, it is preferable that an XY pitch width C which is the interval of the plurality of common lines be made corresponding to the XY pitch width C of the electrodes.

This allows the common line xc1 and the common line xc2 to overlap a part of the sensor wire y1 of the second light transmitting member 4d. That is, although there is a certain thickness of the sheet, the common line xc1 overlaps one part of the sensor wire y1 and, further, common line xc2 overlaps another part of the sensor wire y1, thereby preventing the light transmission amount from being reduced.

With the above configuration, the problem (2) that the wire shadows of the common line xc appear can be solved, thereby preventing the wire shadows of the sensor electrode board 45 including the loop antennas X and Y from being projected on the display surface of the liquid crystal display device.

Similarly, it is possible to prevent the wire shadows of a not-illustrated plurality of common lines of the second light transmitting member 4d from appearing by allowing the common lines and the sensor wire x1 of the second light transmitting member 4c to overlap each other.

In this manner, in order to allow the common line and the sensor wire of the light transmitting member to overlap each other, attachment holes 471 may be formed in the second light transmitting member 4c and the second light transmitting member 4d.

The attachment hole 471 is a cut portion formed in the second light transmitting member 4c which can be used for positioning the second light transmitting member 4c when the second light transmitting member 4c is assembled along the package. Further, the attachment hole 471 is formed also in the second light transmitting member 4d in such a manner as to accurately overlap the attachment hole 471 in the second light transmitting member 4c.

With the above attachment holes 471, especially when the second light transmitting member 4c and the second light transmitting member 4d are used in an overlapping state like the configuration (a) of FIG. 2, it is possible to prevent thickness of the shadows of the electrodes from being increased due to displacement.

Note that a plurality of attachment holes 471 may be provided in each second light transmitting member at any position outside the electrodes.

With the above configuration, it is possible to make the electrode part of the sensor wires x1 and y1 for detection use wider, to thereby make the recognizable area 421 substantially corresponding to the liquid crystal display area 411.

As the liquid crystal panel according to the embodiments of the present invention, not only a liquid crystal panel of 40 inches but also of 50 to 60 inches may be used. Further, a liquid crystal panel of 100 inches or more can be realized, for example, by bonding about four second light transmitting members. In this case, it is preferable to make the pitch widths of the sensor wire x1 or y1 and common line corresponding to each other.

That is, a feature of the second embodiment of the present invention lies in that the dense portion at which the electrodes of the sensor wire is concentrated at the end portion of the sensor wires formed by screen printing on the second light transmitting member is provided outside the display area of the liquid crystal panel.

Another feature of the second embodiment of the present invention lies in that the thickness or pitch width of the common line of the sensor wire of the second light transmitting member and that of the sensor wire are made corresponding to each other.

A configuration as illustrated in FIG. 16 in which a thicker common line is provided outside the liquid crystal display area 410 may be possible in place of the configuration in which two common lines xc1 and xc2 are provided. In this case, it is preferable that the common line be printed in the portion corresponding to the frame portion.

Further, although only one connector 460 or 461 is illustrated in the drawing, a plurality of connectors can actually be used.

Further, as to the backlight 5, when the LEDs are arranged in an array, light can be diffused by the light diffusion member 2 in more uniform manner than in the case where a cold-cathode tube lamp is used. In this case, the wire shadows of the sensor wire x1 (or sensor wire y1) hardly appear.

The configurations and operations of the above embodiments are merely exemplary, and various modification may be made without departing from the spirit and scope of the invention.

EXPLANATION OF REFERENCE SYMBOLS

Figure 1:
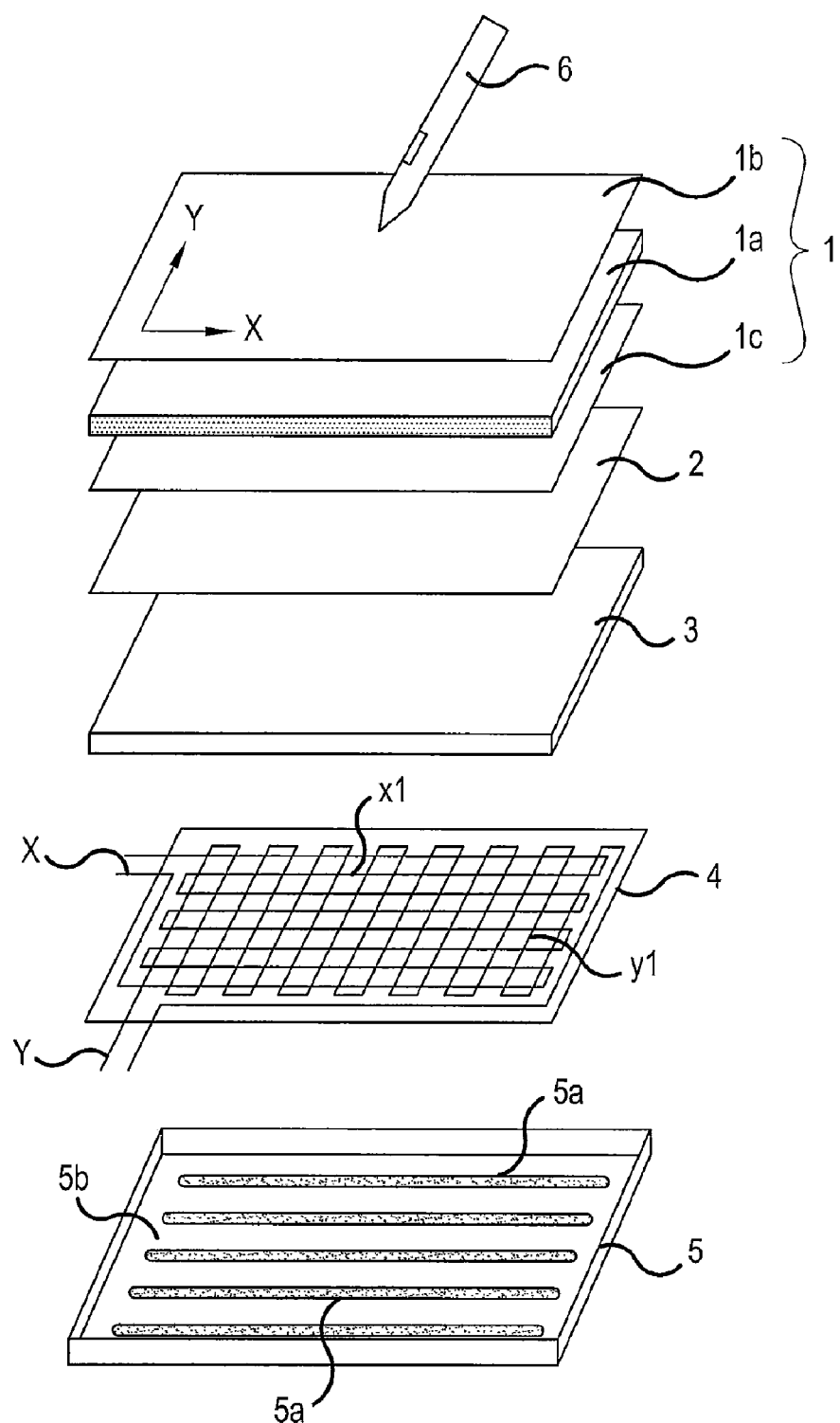
FIG. 1 is an exploded perspective view illustrating a configuration example of a digitizer function-equipped liquid crystal display device according to the present invention.
Figure 2:
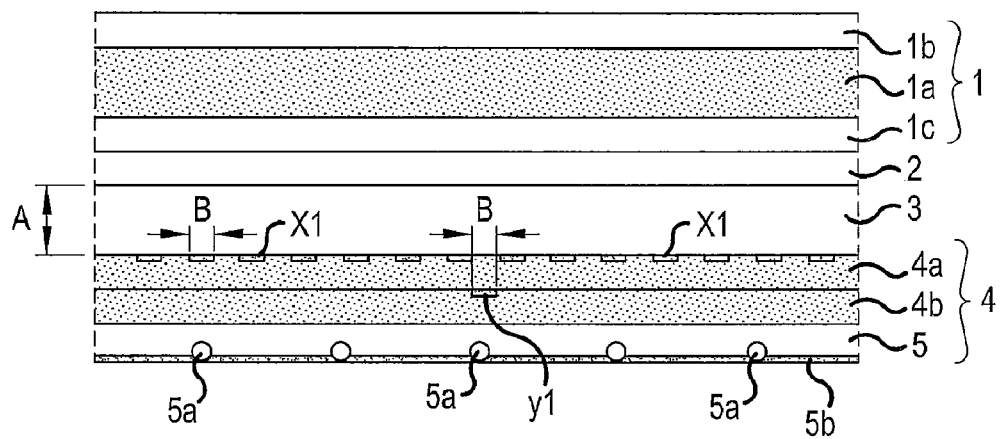
FIG. 2 is a cross-sectional view of the main part of the digitizer function-equipped liquid crystal display device of FIG. 1.
Figure 3:
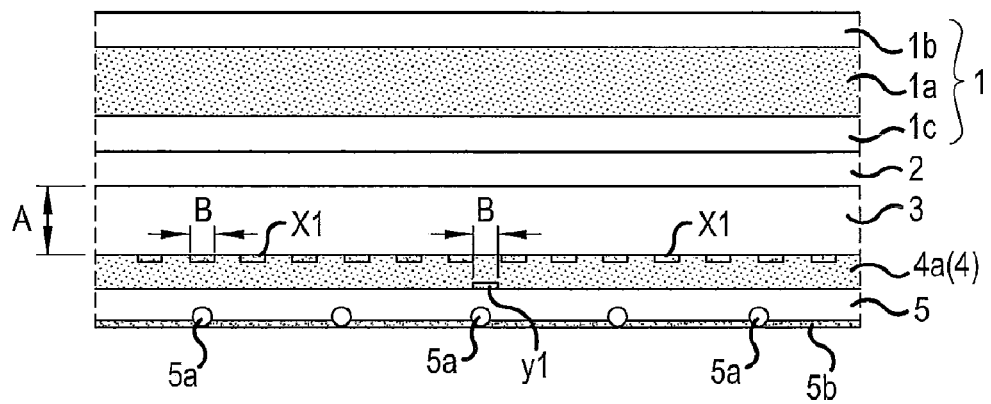
FIG. 3 is a cross-sectional view of the main part of another embodiment of the digitizer function-equipped liquid crystal display device according to the present invention.
Figure 4:
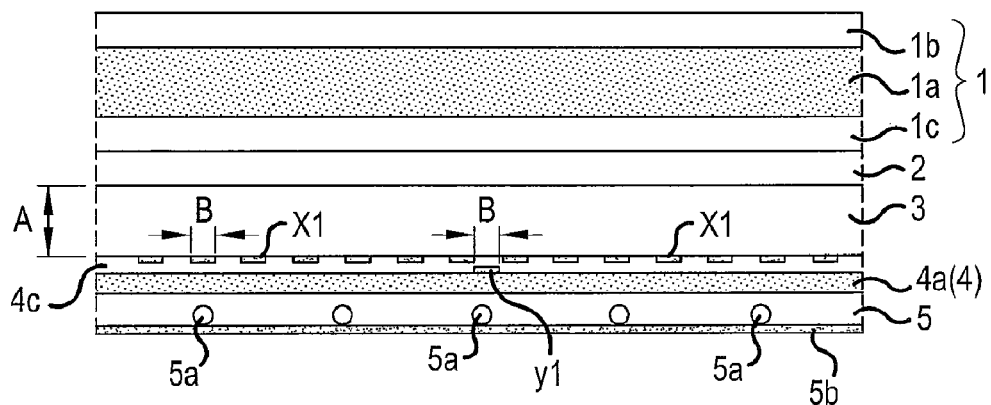
FIG. 4 is a cross-sectional view of the main part of another embodiment of the digitizer function-equipped liquid crystal display device according to the present invention.
Figure 5:
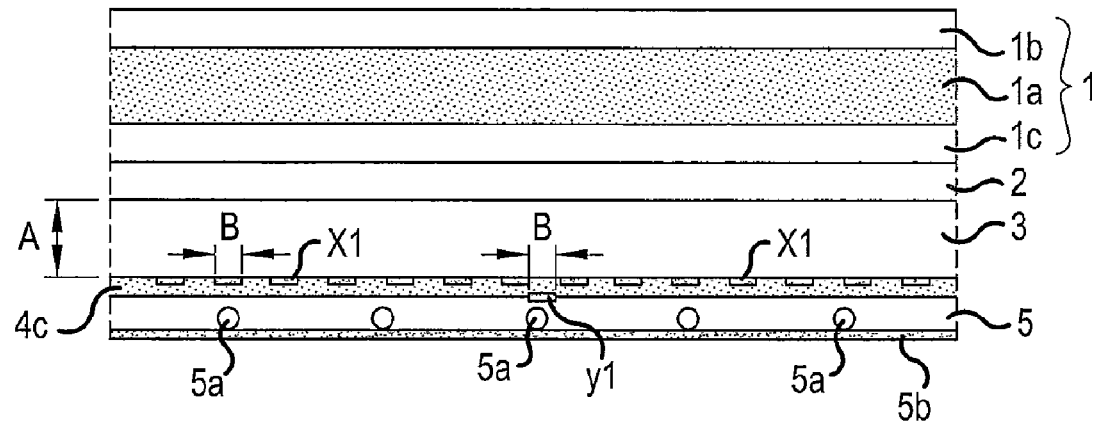
FIG. 5 is a cross-sectional view of the main part of another embodiment of the digitizer function-equipped liquid crystal display device according to the present invention.
Figure 6:
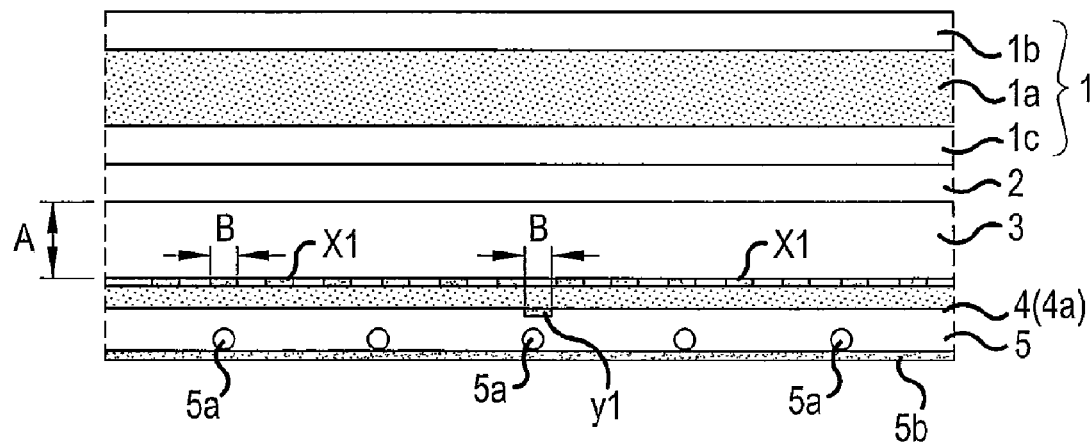
FIG. 6 is a cross-sectional view of the main part of another embodiment of the digitizer function-equipped liquid crystal display device according to the present invention.
Figure 7:
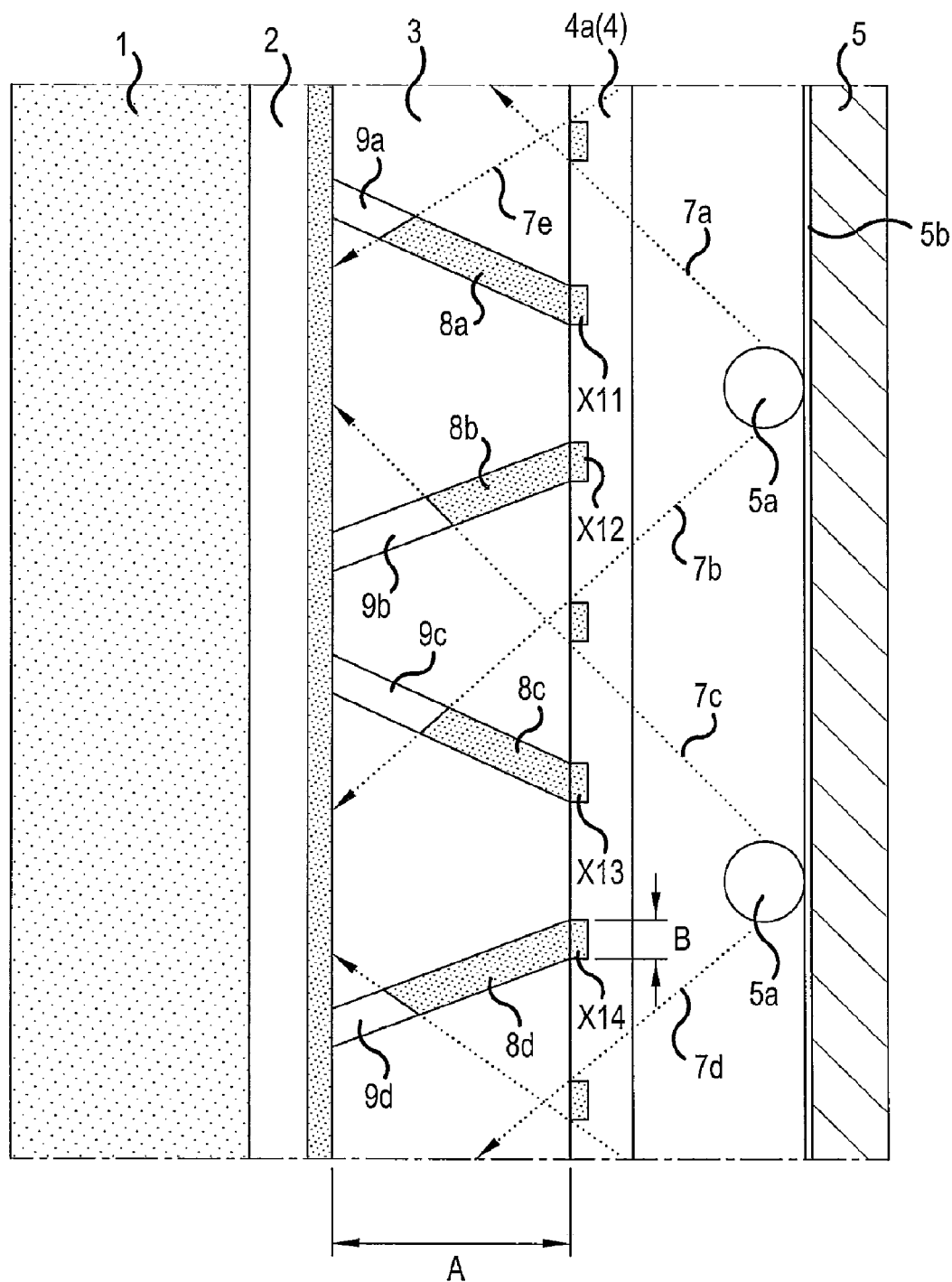
FIG. 7 is a cross-sectional view of the digitizer function-equipped liquid crystal display device illustrated in FIG. 2 which explains progression in light path of light emitted from a backlight.
Figure 8:
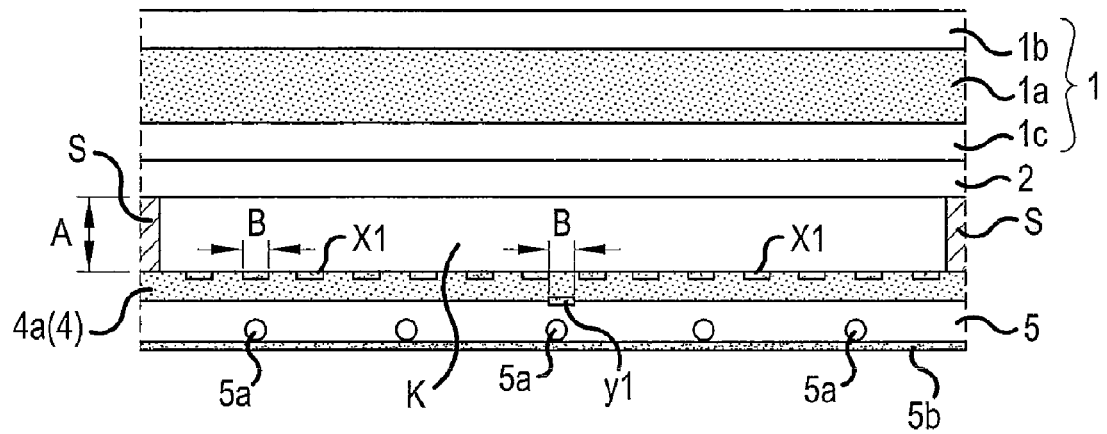
FIG. 8 is a cross-sectional view of the main part of another embodiment of the digitizer function-equipped liquid crystal display device according to the present invention.
Figure 9:
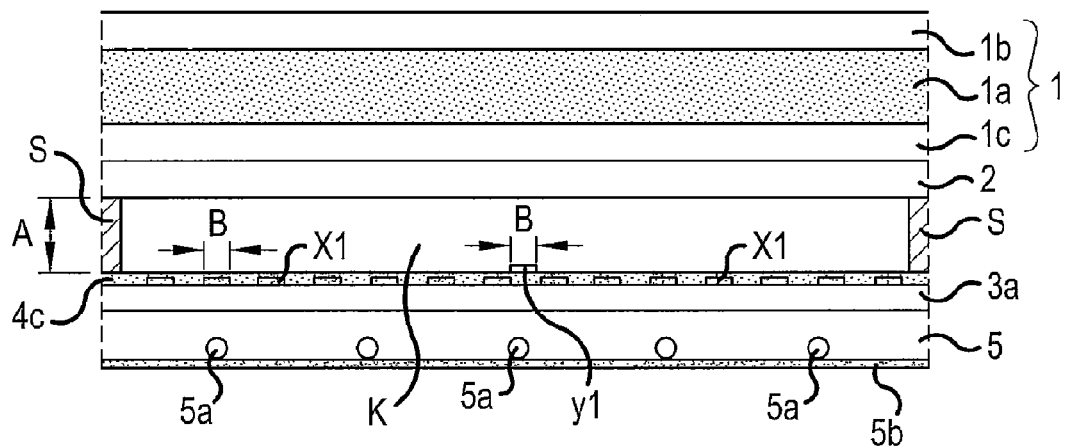
FIG. 9 is a cross-sectional view of the main part of another embodiment of the digitizer function-equipped liquid crystal display device according to the present invention.
Figure 10:
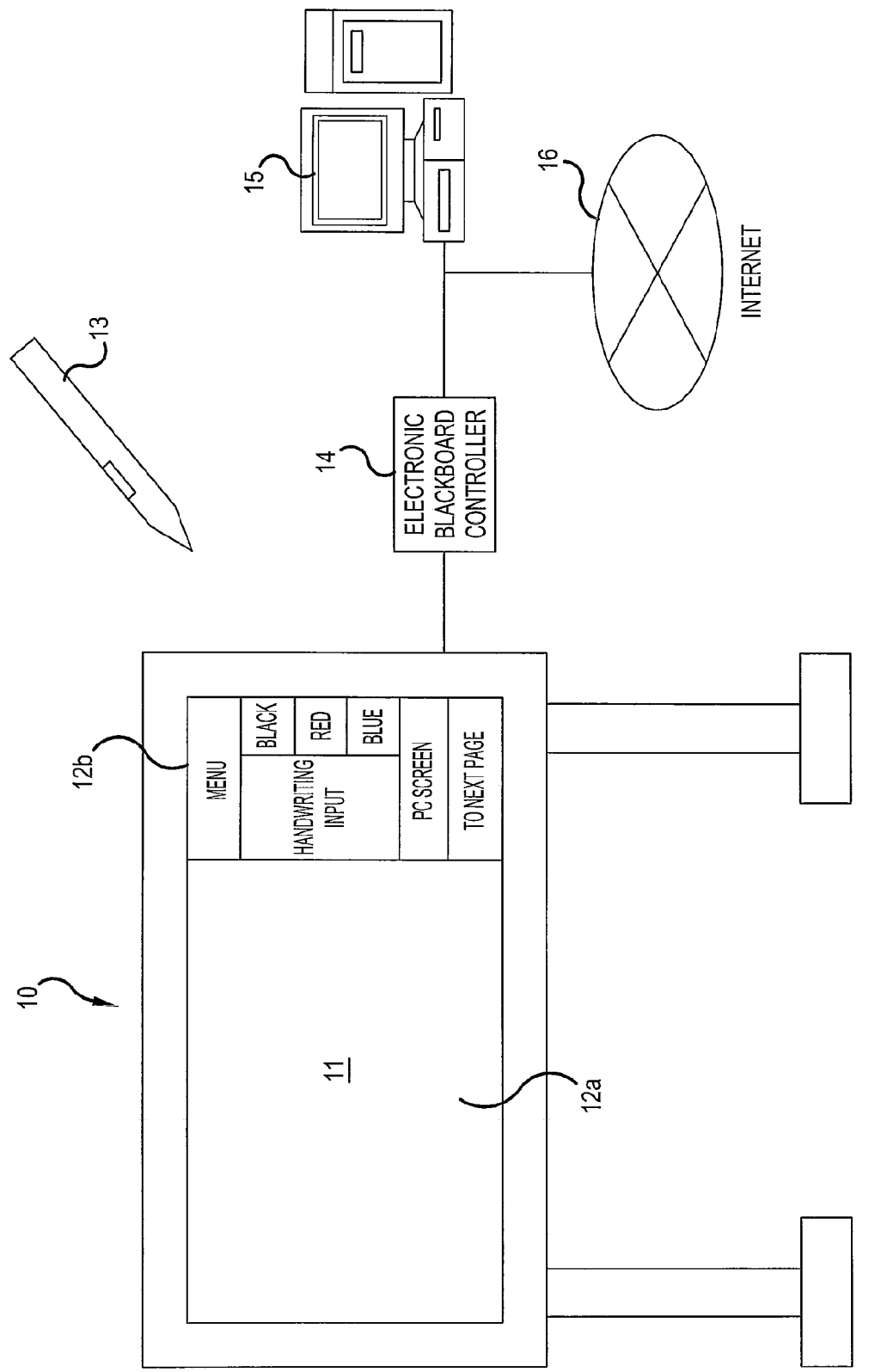
FIG. 10 is a view for explaining an example of a configuration of an electronic blackboard system to which the digitizer function-equipped liquid crystal display device according to the present invention is applied.
Figure 11A:
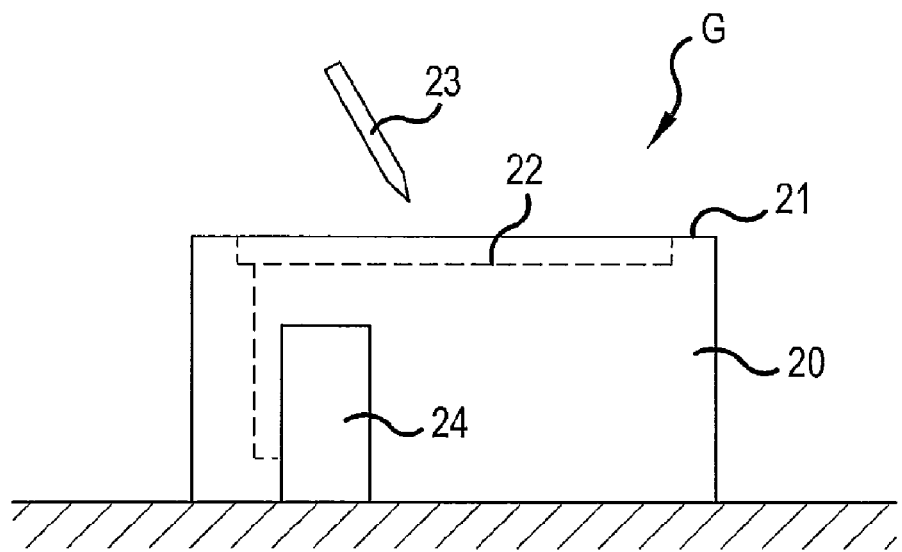
FIG. 11 is a side view illustrating a basic configuration of a game device to which the digitizer function-equipped liquid crystal display device according to the present invention is applied; (a) illustrates a case where the digitizer function-equipped liquid crystal display device is installed horizontally in a game table; and (b) illustrates a case where the digitizer function-equipped liquid crystal display device is installed in the game table so as to be inclined with respect to the horizontal direction.
Figure 11B:
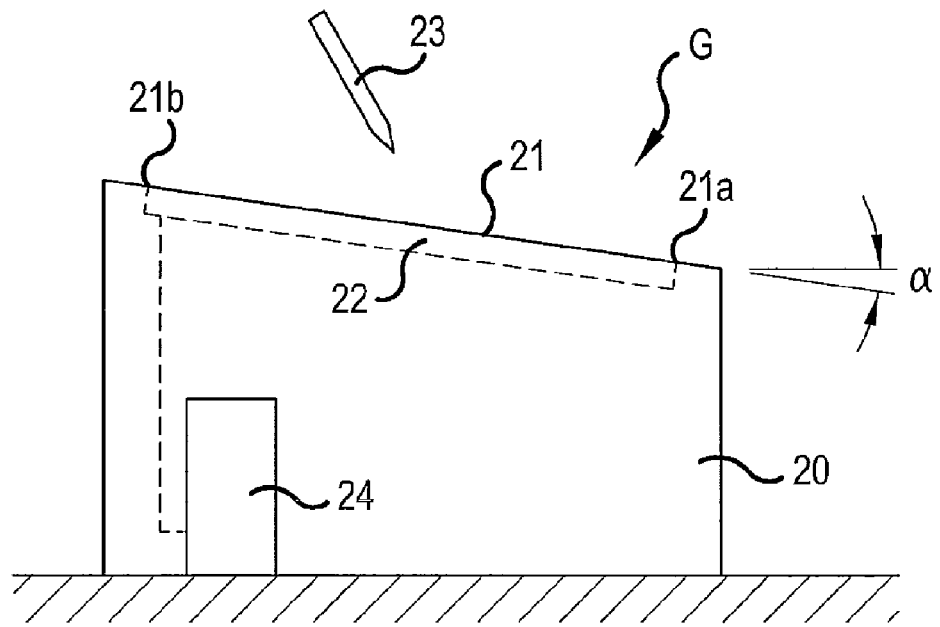
Figure 12A:
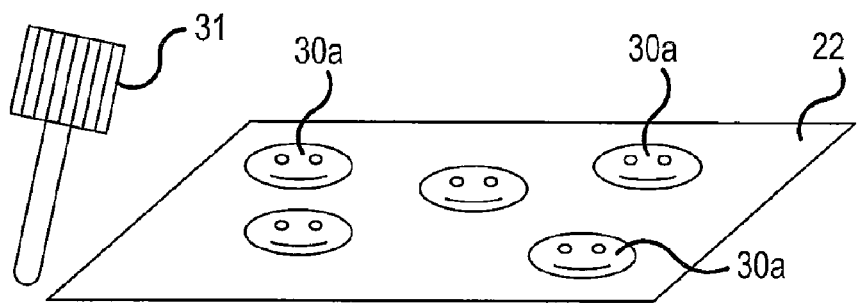
FIG. 12 is a view for explaining an example of a game that can be executed in a game device illustrated in FIG. 11, which illustrates a "whack-a-mole game".
Figure 12B:
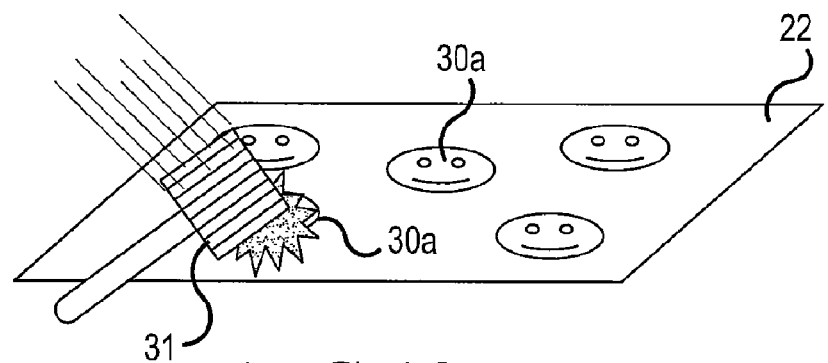
Figure 12C:
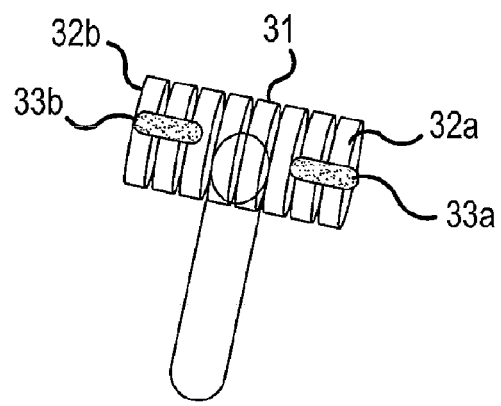
Figure 13A:
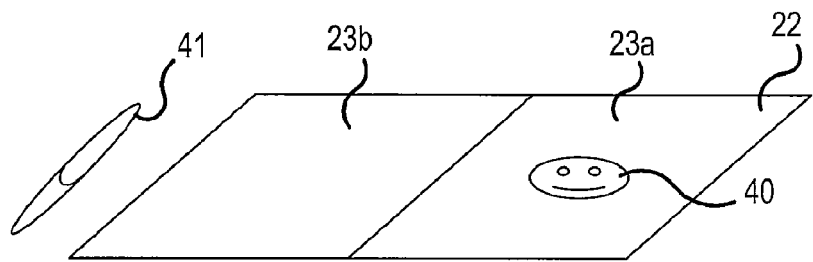
FIG. 13 is a view for explaining an example of a game that can be executed in a game device illustrated in FIG. 11, which illustrates a "painting game".
Figure 13B:
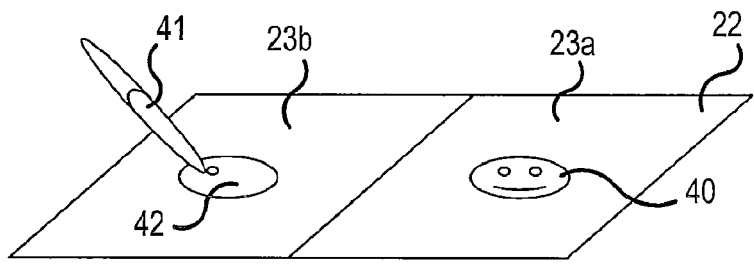
Figure 13C:
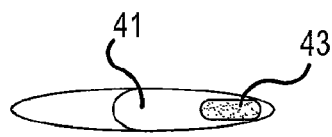
Figure 14:
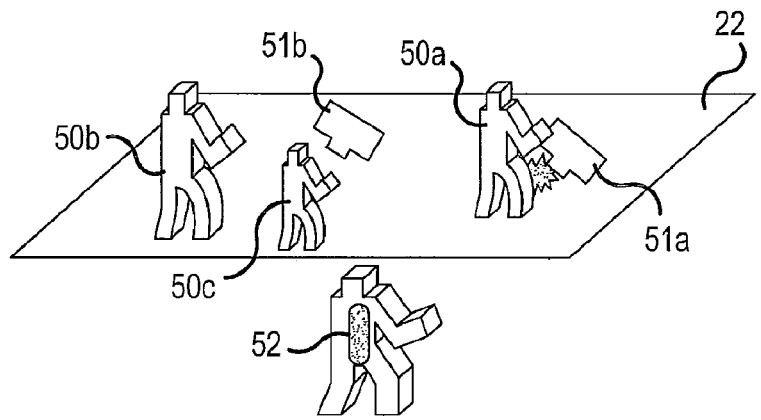
FIG. 14 is a view for explaining an example of a game that can be executed in a game device illustrated in FIG. 11, which illustrates a "fighting game".
Figure 15:
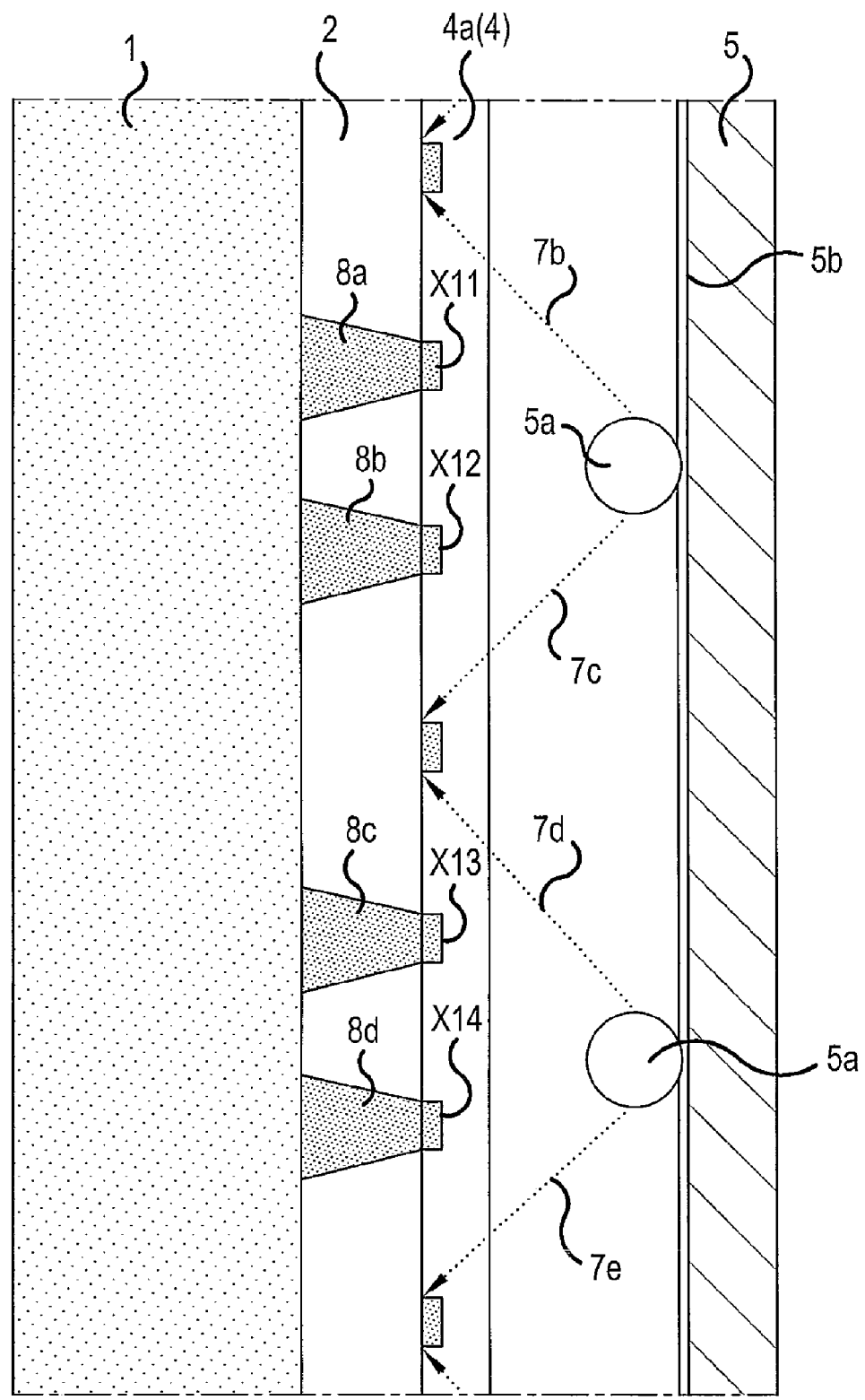
FIG. 15 is a cross-sectional view of a digitizer function-equipped liquid crystal display device in which the first light transmitting member is not provided, which explains progression in light path of light emitted from a backlight.
Figure 16:
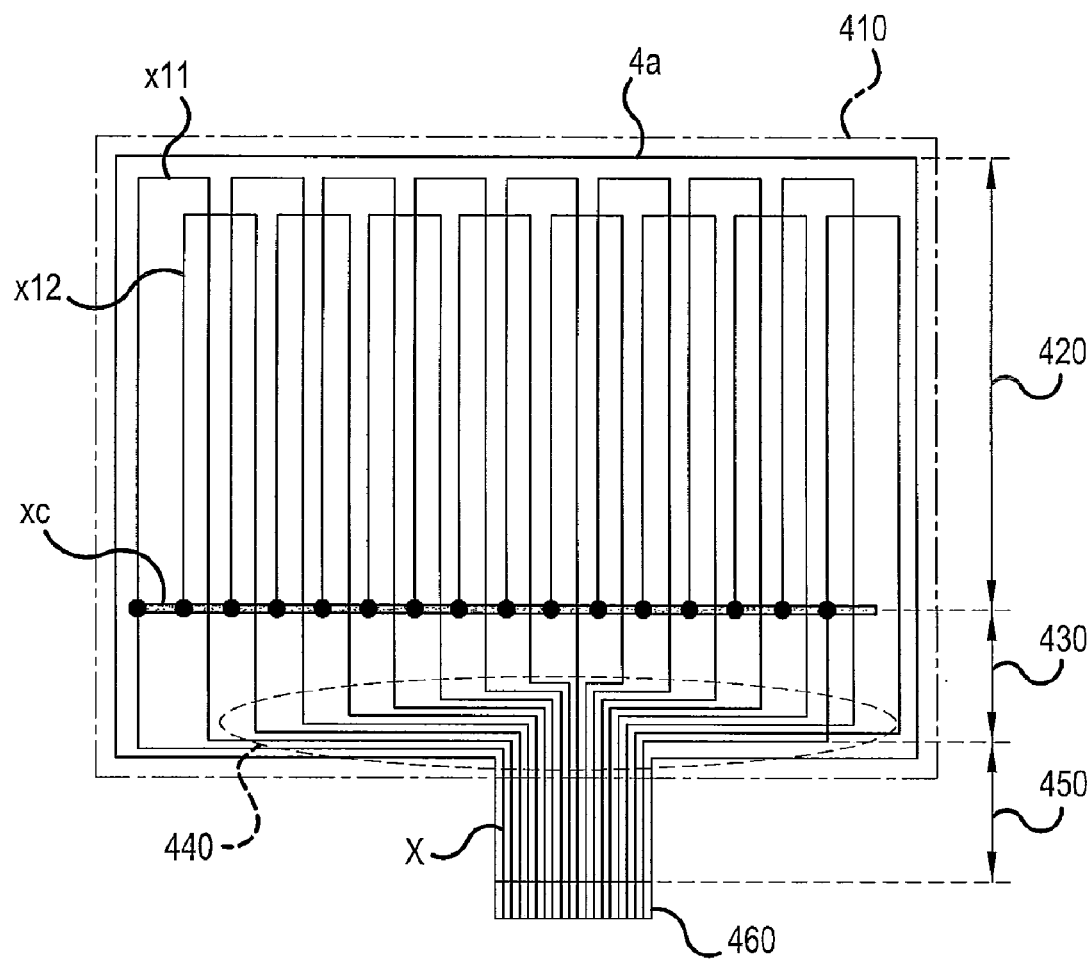
FIG. 16 is a conceptual view illustrating a configuration of a loop antenna X of a second light transmitting member 4a according to the first embodiment of the present invention.
Figure 17:
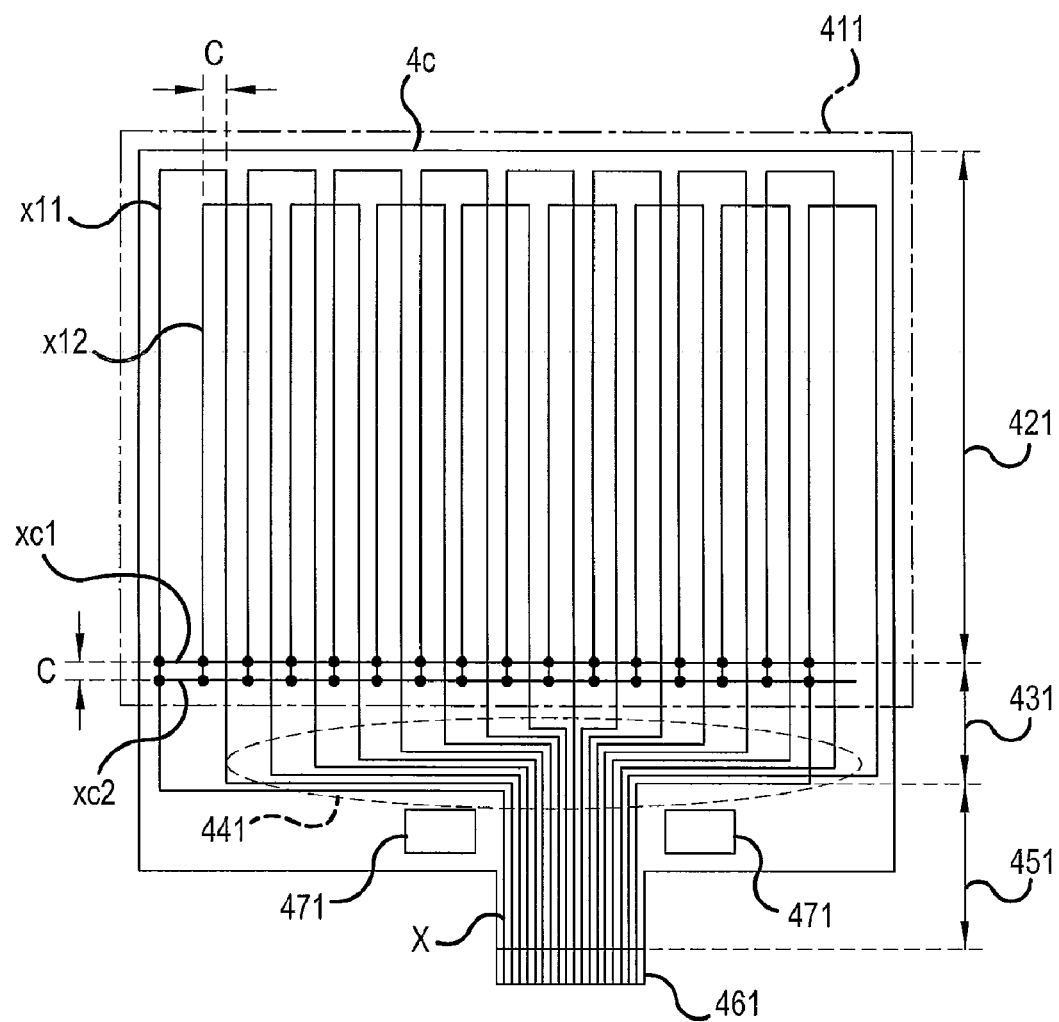
FIG. 17 is a conceptual view illustrating a configuration of a loop antenna X of a second light transmitting member 4c according to a second embodiment of the present invention.

1: Liquid crystal panel
1a: Liquid crystal plate
1b, 1c: Polarization plate
2: Light diffusion member
3: First light transmitting member
3a: First light transmitting member
4, 45: Sensor electrode board
4a, 4b, 4c, 4d: Second light transmitting member
5: Backlight
5a: Light source
5b: Reflective layer
6, 13: Pen type input device
10: Electronic blackboard
11, 22: Digitizer function-equipped liquid crystal display device
21: Game table
24: Controller
30a to 30d: Game character image
31: Hammer
32a, 32b: Whacking portion
33a, 33b: Coil
41: Position indicator
40: Theme picture
42: Picture imitating theme picture
50a, 50b: Robot (figure)
51a, 51b: Arm of enemy
410, 411: Liquid crystal display area
420, 421: Recognizable range
430, 431: Recognition-disabled range
440, 441: Dense portion
450, 451: Connector extraction portion
460, 461: Connector
471: Attachment hole
A: Width
C: XY pitch width
G: Game device
K: Empty space portion
S: Spacer
X: Loop antenna
Y: Loop antenna
x1: Sensor wire
y1: Sensor wire
xc, xc1, xc2, yc: Common line

The invention claimed is:

1. A digitizer function-equipped liquid crystal display device comprising:
    a liquid crystal panel;
    a light diffusion member disposed between the liquid crystal panel and a backlight irradiating the liquid crystal panel with light;
    an electromagnetic induction type loop antenna provided at a position with a distance which directs from the light diffusion member to the backlight, which detects a position of the plane of the liquid crystal panel for one direction of one axis and for another direction of one axis intersecting the one direction of one axis; and spacing retaining means for retaining the spacing between the light diffusion member and the loop antenna.

2. The digitizer function-equipped liquid crystal display device according to claim 1, wherein
the spacing retaining means is a first light transmitting member having two surfaces.

3. The digitizer function-equipped liquid crystal display device according to claim 2, wherein
at least a part of the loop antenna is comprised by a sensor wire which is formed on a second light transmitting member having two surfaces by screen printing.

4. The digitizer function-equipped liquid crystal display device according to claim 3, wherein
the loop antenna having:
the sensor wire detecting the position for one direction of one axis being formed on one surface of the second light transmitting member; and
the sensor wire detecting the position for another direction of one axis intersecting the one direction of one axis being formed on one surface of the second light transmitting member.

5. The digitizer function-equipped liquid crystal display device according to claim 4, wherein
the loop antenna having:
the sensor wire detecting the position for one direction of one axis being formed on one surface of one second light transmitting member; and
the sensor wire detecting the position for another direction of one axis intersecting the one direction of one axis being formed on one surface of another second light transmitting member.

6. The digitizer function-equipped liquid crystal display device according to claim 3, wherein
the loop antenna having:
the sensor wire detecting the position for one direction of one axis being formed on one surface of the second light transmitting member;
an insulating layer allowing light to transmit therethrough being formed on the sensor wire detecting the position for one direction of one axis; and
the sensor wire detecting the position for another direction of one axis intersecting the one direction of one axis being formed on the insulating layer.

7. The digitizer function-equipped liquid crystal display device according to claim 3, wherein
the loop antenna having:
the sensor wire detecting the position for one direction of one axis being formed by screen printing on the surface of the first light transmitting member that is close to the second light transmitting member; and
the sensor wire detecting the position for another direction of one axis intersecting the one direction of one axis being formed on one surface of the second light transmitting member.

8. The digitizer function-equipped liquid crystal display device according to claim 3, wherein
the loop antenna having:
the sensor wire detecting the position for one direction of one axis being formed by screen printing on one surface of the first light transmitting member;
an insulating layer allowing light to transmit therethrough being formed on the sensor wire that detects a position in the one coordinate axis direction; and
the sensor wire detecting the position for another direction of one axis intersecting the one direction of one axis being formed by screen printing on the insulating layer.

9. A game device provided with the digitizer function-equipped liquid crystal display device as claimed in claim 3.

10. The game device according to claim 9, wherein
the digitizer function-equipped liquid crystal display device is installed horizontally in a game table of the game device.

11. The game device according to claim 9, wherein the digitizer function-equipped liquid crystal display device is installed in a game table of the game device being inclined by a predetermined angle with respect to the horizontal direction such that the surface of the digitizer function-equipped liquid crystal display device rises from the front side of the game table toward the far side thereof.

12. The digitizer function-equipped liquid crystal display device according to claim 3, wherein
a dense portion at which the electrodes of the sensor wire is concentrated at the end portion of the sensor wires formed on the second light transmitting member is provided outside the display area of the liquid crystal panel.

13. The digitizer function-equipped liquid crystal display device according to claim 3, wherein
thickness or pitch width of a common line of the sensor wire of the second light transmitting member and that of the sensor wire are corresponded.

* * * * *